United States Patent
Kuwahara

(10) Patent No.: US 11,301,229 B2
(45) Date of Patent: *Apr. 12, 2022

(54) SYSTEM UPDATE DEVICE AND SYSTEM UPDATE METHOD

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/040,258

(22) PCT Filed: Mar. 1, 2019

(86) PCT No.: PCT/JP2019/008058
§ 371 (c)(1),
(2) Date: Sep. 22, 2020

(87) PCT Pub. No.: WO2019/187975
PCT Pub. Date: Oct. 3, 2019

(65) Prior Publication Data

US 2021/0011701 A1 Jan. 14, 2021

(30) Foreign Application Priority Data

Mar. 29, 2018 (JP) .............................. JP2018-063842

(51) Int. Cl.
*G06F 8/61* (2018.01)
*G06F 8/658* (2018.01)
*G06F 11/14* (2006.01)

(52) U.S. Cl.
CPC ................ *G06F 8/62* (2013.01); *G06F 8/658* (2018.02); *G06F 11/1433* (2013.01)

(58) Field of Classification Search
CPC ... G06F 8/62; G06F 8/65; G06F 8/658; G06F 11/1433; G06F 9/3855; G06F 9/46

(Continued)

(56) References Cited

U.S. PATENT DOCUMENTS

2006/0004756 A1 1/2006 Peleg et al.
2006/0085404 A1 4/2006 Kusunoki
(Continued)

FOREIGN PATENT DOCUMENTS

JP 2006-119848 A 5/2006
JP 2008-501180 A 1/2008
(Continued)

OTHER PUBLICATIONS

International Search Report for PCT Application No. PCT/JP2019/008057, dated May 21, 2019.
(Continued)

*Primary Examiner* — Wei Y Zhen
*Assistant Examiner* — Mohammed N Huda
(74) *Attorney, Agent, or Firm* — Sughrue Mion, PLLC

(57) ABSTRACT

A system update device 10 includes a first procedure generation unit 12 which generates a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order; a planning unit 13 which plans an operation procedure for transitioning, from an arbitrary state during execution of the update procedure to the current state, the state of a state element which corresponds to a part of the update procedure that includes operations for which a reverse operation cannot be generated; and a second procedure generation unit 14 which generates a rollback procedure by combining the generated reverse execution procedure and the planned procedure.

20 Claims, 30 Drawing Sheets

(58) Field of Classification Search
USPC .......................................................... 717/170
See application file for complete search history.

(56) References Cited

U.S. PATENT DOCUMENTS

| | | | | |
|---|---|---|---|---|
| 2009/0217163 | A1* | 8/2009 | Jaroker | G06F 8/65 717/174 |
| 2011/0131563 | A1* | 6/2011 | Ohama et al. | G06F 8/65 717/168 |
| 2014/0297355 | A1 | 10/2014 | Ohashi et al. | |

FOREIGN PATENT DOCUMENTS

| | | |
|---|---|---|
| JP | 2014-191604 A | 10/2014 |
| JP | 2017-162256 A | 9/2017 |
| WO | 2010/035596 A1 | 4/2010 |

OTHER PUBLICATIONS

T. Kuroda and A. Gokhale, "Model-Based IT Change Management for Large System Definitions with State-Related Dependencies," 2014 IEEE 18th International Enterprise Distributed Object Computing Conference, Ulm, 2014, pp. 170-179, USA.

T. Kuroda, M. Nakanoya, A. Kitano and A. Gokhale, "The configuration-oriented planning for fully declarative IT system provisioning automation," NOMS 2016-2016IEEE/IFIP Network Operations and Management Symposium, Istanbul, 2016, pp. 808-811, USA.

M. Nakanoya, T. Kuroda and A. Kitano, "Automated Change Planning for Differential Update IT Systems with State Constraint," 2016 IEEE 20thInternational Enterprise Distributed Object Computing Workshop (EDOCW), Vienna,2016, pp. 130-138, USA.

C. Muise, S. A. McIlraith and J. C. Beck, "Optimally relaxing partial-order plans with MaxSAT," In Proceedings of the 22nd International Conference on Automated Planning and Scheduling, 2012, pp. 358-362, USA.

* cited by examiner

FIG. 5
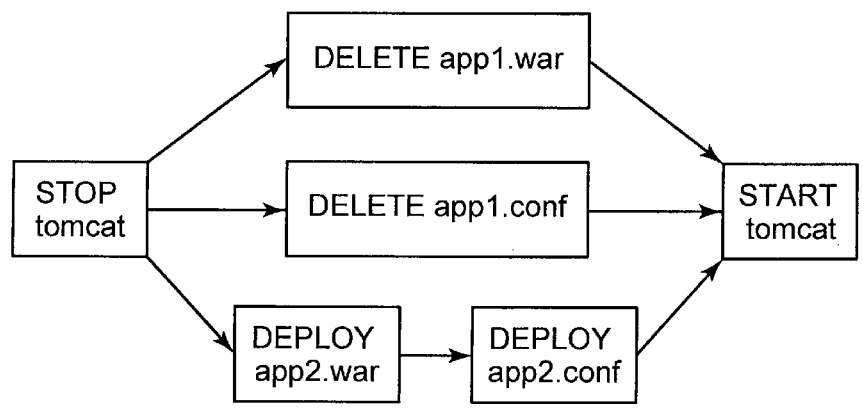
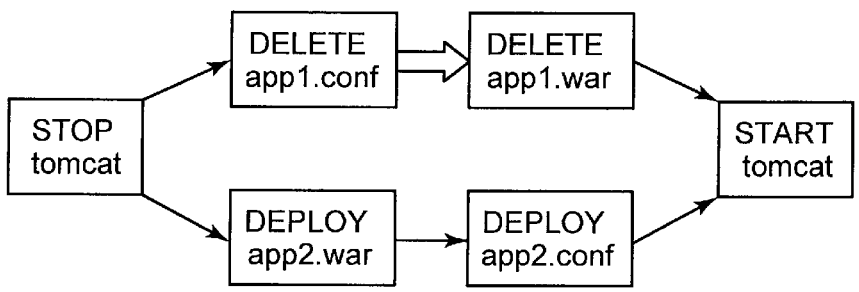

SYSTEM UPDATE DEVICE AND SYSTEM UPDATE METHOD

This application is a National Stage Entry of PCT/JP2019/008058 filed on Mar. 1, 2019, which claims priority from Japanese Patent Application 2018-063842 filed on Mar. 29, 2018, the contents of all of which are incorporated herein by reference, in their entirety.

TECHNICAL FIELD

The present invention relates to a system update device and a system update method.

BACKGROUND ART

System administrators develop a procedure for a system construction operation and a procedure for a system update operation on the basis of, for example, an appropriate template acquired from a storage unit storing procedure templates. However, administrators are sometimes required to manually develop a procedure from the beginning depending on the situation.

For example, when a system update operation is executed and if appropriate procedure templates for the current system configuration before the update and the target system configuration after the update are not stored in the storage unit, an administrator is required to manually develop an appropriate procedure from the beginning.

As described above, a system construction operation and a system update operation in which a procedure according to a request is manually developed are referred to as an imperative system construction operation and an imperative system update operation. In particular, since an updating operation itself is often complicated, the imperative system update operation has a problem that developing a procedure takes enormous man-hours.

In contrast to the imperative system construction operation and the imperative system update operation, a system construction operation and a system update operation in which a procedure according to a request is automatically generated are referred to as a declarative system construction operation and a declarative system update operation. In the declarative system construction operation and the declarative system update operation, the storage unit stores system components, such as parts, and the relations between the components.

For example, in the declarative system update operation, the stored information is used to divide the current system configuration and the target system configuration into respective components. Then, the divided components of the respective configurations are compared with each other, whereby an operation procedure capable of updating the current system configuration to the target system configuration is generated each time the update operation is executed.

As described above, the declarative system update operation has an advantage that no procedure needs to be manually developed. That is, the declarative system update operation is an operation for automatically updating the system configuration to the update target configuration. The declarative system construction operation is an operation for automatically constructing the construction target system.

As a technique for automatically generating a construction procedure and an update procedure on the basis of a difference between the current system configuration and the target system configuration, using the above declarative system construction technique and declarative system update technique, Non Patent Literature (NPL) 1 to NPL 3 each disclose a procedure generation device. FIG. 32 is an explanatory diagram showing an example of an automatic procedure generation process by a general procedure generation device.

As shown in FIG. 32, the configuration management unit of a system inputs the current system configuration as configuration information to the procedure generation device. In addition, the system administrator inputs the target system configuration as configuration information to the procedure generation device.

The procedure generation device shown in FIG. 32 compiles the input configuration information to generate state information indicating the state of the current system configuration and state information indicating the state of the target system configuration. The state information indicates the components of the system and the relations between the components described above.

Then, the procedure generation device shown in FIG. 32 obtains a state difference that is a difference between the state of the current system configuration and the state of the target system configuration by comparing the generated state information of each of them. Then, the procedure generation device searches for an operation procedure capable of updating the current system configuration to the target system configuration using the state difference.

As a result of searching for the procedure, Workflow as shown in FIG. 32 is generated. In addition, as shown in FIG. 32, the procedures constituting Workflow are executed in the respective systems. That is, the administrator who develops an operation procedure using the procedure generation device shown in FIG. 32 can automatically obtain a relatively reliable operation procedure by simply inputting the target system configuration.

In addition, Patent Literature (PTL) 1 also discloses a software update device capable of automating software update operations for a plurality of information processing devices, including an action confirmation operation, thereby reducing the load on a system administrator.

In addition, PTL 2 also discloses an operation manual management method for specifying the execution order of a plurality of operations for a plurality of related components.

In addition, PTL 3 discloses a firmware update device that can handle malfunction during updating and has a short system down time due to updating, while reducing the nonvolatile memory capacity for storing firmware.

In addition, NPL 4 discloses about the MaxSAT solver.

CITATION LIST

Patent Literature

PTL 1: Japanese Patent Application Laid-Open No. 2006-119848
PTL 2: Japanese Patent Application Laid-Open No. 2017-162256
PTL 3: International Publication WO 2010/035596

Non Patent Literature

NPL 1: T. Kuroda and A. Gokhale, "Model-Based IT Change Management for Large System Definitions with State-Related Dependencies," 2014 IEEE 18th International Enterprise Distributed Object Computing Conference, Ulm, 2014, pages 170-179.

NPL 2: T. Kuroda, M. Nakanoya, A. Kitano and A. Gokhale, "The configuration-oriented planning for fully declarative IT system provisioning automation," NOMS 2016-2016 IEEE/IFIP Network Operations and Management Symposium, Istanbul, 2016, pages 808-811.

NPL 3: M. Nakanoya, T. Kuroda and A. Kitano, "Automated Change Planning for Differential Update IT Systems with State Constraint," 2016 IEEE 20th International Enterprise Distributed Object Computing Workshop (EDOCW), Vienna, 2016, pages 130-138.

NPL 4: C. Muise, S. A. McIlraith and J. C. Beck, "Optimally relaxing partial-order plans with MaxSAT," In Proceedings of the 22nd International Conference on Automated Planning and Scheduling, 2012, pages 358-362.

SUMMARY OF INVENTION

Technical Problem

In general, when a construction operation procedure and an update operation procedure are developed, a rollback procedure (an exception handling procedure), which is the procedure of the operation executed when an exception occurs, is also required to be developed each time an operation is executed.

The required rollback procedure is a procedure to be used to return the state of a system to the initial state when, for example, the next execution target task that constitutes a normal procedure cannot be executed. The initial state is the state of the system before an operation is executed.

Exceptions that can occur are, for example, lack of resources, stop due to a user's interruption, occurrence of abnormality in firmware after update, and extension of scheduled execution time. The exception state is a state of the target system other than the states of the target system that can occur during execution of the normal procedure.

For example, when a communication service provided by a communication network of a telecommunications carrier is stopped, the damage to the carrier is large. In addition, when a communication service is stopped, the telecommunications carrier is also required to report the failure to the relevant government ministries and agencies.

As described above, in order to operate a communication network, it is required to promptly restore the communication service when an exception occurs, and a safe restoration operation plan is required in advance. For example, a recovery operation plan "guaranteeing that recovery is done within 30 minutes at most if an exception occurs" is required.

The procedure generation device shown in FIG. 32 is not supposed to generate a rollback procedure. Thus, if the procedure generation device is simply used when an exception occurs, a rollback procedure for transitioning the state of the system from the state when the exception has occurred to the initial state is generated each time an exception occurs. Then, the generated rollback procedure is executed.

However, if the procedure generation device cannot generate a procedure that can be rolled back, the administrator fails to handle the exception. In addition, if the procedure generation device takes a long time to execute the computation process for generating a rollback procedure, it can be too late to handle the exception.

Thus, it is preferable that rollback procedures generated on the basis of a safe recovery operation plan are prepared in advance for all points at which an exception can occur.

Note that, all the points are basically all the points during a construction operation or all the points during an update operation.

FIG. 33 shows a system update process to be executed on the basis of the above design concept of "preparing rollback procedures for all points at which an exception can occur". FIG. 33 is an explanatory diagram showing an example of a system update process by a system update device.

The administrator inputs, for example, a component model indicating the current system configuration and a component model indicating the modification target system configuration to the system update device (step S001). The system update device designs an update operation procedure on the basis of the input component models (step S002).

In addition, the system update device constructed on the basis of the above design concept designs rollback procedures for all points at which an exception can occur during an update operation (step S003). The system update device stores the designed rollback procedure group in the storage unit (step S004).

Then, the system update device modifies the configuration of the target system in accordance with the designed update operation procedure (step S005). By executing the process of step S005, the state of the target system transitions from the initial state to the target state. The target state is the state of the system after the operation is executed.

In addition, when an exception occurs during execution of the update operation procedure, the system update device acquires, from the storage unit, a rollback procedure corresponding to the state of the system when the exception has occurred. Then, the system update device executes rollback in accordance with the acquired rollback procedure (step S006). By executing the process of step S006, the state of the target system transitions from the state when the exception has occurred to the initial state.

That is, in the system update process shown in FIG. 33, rollback procedures are comprehensively designed in advance on the basis of the component model information. Thus, when an exception occurs, the system update device can immediately roll back the state of the target system from the fault state to the initial state.

However, the system update process shown in FIG. 33 has a problem that there are many states during the update operation for which rollback procedures are prepared in advance. For example, if there are 149 states in total that can occur during the update operation, the system update device is required to prepare 149 rollback procedures in advance.

Thus, when the method of preparing the rollback procedures for the states during the update operation is adopted, the resource amount required for the preparation of the rollback procedures (particularly, the resource amount required for the computation process) can become enormous.

In addition, when the update operation procedure is represented by a partially-ordered set of tasks, the number of states that occur during execution of a predetermined task is not fixed to one. An ordered set is a set in which the concept of order is defined. Of ordered sets, a partially-ordered set is an ordered set that allows the cases in which the order of elements cannot be compared. In addition, of ordered sets, a totally ordered set is an ordered set that does not allow the cases in which the order of elements cannot be compared.

That is, a procedure represented by a totally ordered set (hereinafter referred to as a totally ordered procedure) is a serial procedure in which tasks are arranged in a line. Alternatively, a procedure represented by a partially-ordered set (hereinafter, referred to as a partially-ordered procedure)

is a procedure in which two or more tasks are arranged in random order to be executable. FIG. 34 is an explanatory diagram showing an example of a partially-ordered procedure.

The partially-ordered procedure shown in FIG. 34 is a procedure for constructing two virtual machines using OpenStack (registered trademark) and activating them as an application server and a database server.

One rectangle shown in FIG. 34 represents one task. The Black rectangles represent executed tasks. The white rectangles represent unexecuted tasks. Each arrow shown in FIG. 34 extends from a task to be executed earlier to a task to be executed later.

In the partially-ordered procedure shown in FIG. 34, the execution order of tasks that can be executed in parallel differs depending on the situation at the time of execution. For example, the execution order of the task "Create serverXml1", the task "Make directory C", and the task "Create DBInstance YY" shown in FIG. 34 is not determined.

That is, when the system construction or the system update is executed in accordance with the partially-ordered procedure as shown in FIG. 34, the number of states of the system that can occur during the execution is more than that when the totally-ordered procedure is used. If a partially-ordered procedure is used, the resource amount required to prepare rollback procedures can be further increased.

As a method for reducing the resource amount required to prepare rollback procedures, for example, PTL 3 discloses a method for simply generating a rollback procedure by generating reverse operations of operations included in an update operation procedure and arranging the generated reverse operations in the reverse order of the update operation procedure.

However, due to the complexity of a system being updated, a rollback procedure simply generated by the above method is sometimes un-executable. In order to generate an executable rollback procedure, preparation based on the update operation procedure is required.

Object of Invention

For this reason, one of an object of the present invention is to provide a system update device and a system update method that can solve the above problems and reduce the resource amount required to prepare rollback procedures.

Solution to Problem

In an exemplary embodiment of the present invention, a system update device includes a reverse operation generation unit that generates a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order, a first procedure generation unit that generates a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order, a planning unit that plans an operation procedure for transitioning, from an arbitrary state during execution of the update procedure to the current state, the state of a state element which corresponds to a part of the update procedure that includes operations for which a reverse operation cannot be generated, and a second procedure generation unit that generates a rollback procedure by combining the generated reverse execution procedure and the planned procedure.

In an exemplary embodiment of the present invention, a system update method includes generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order, generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order, planning an operation procedure for transitioning, from an arbitrary state during execution of the update procedure to the current state, the state of a state element which corresponds to a part of the update procedure that includes operations for which a reverse operation cannot be generated, and generating a rollback procedure by combining the generated reverse execution procedure and the planned procedure.

In an exemplary embodiment of the present invention, a system update program causing a computer to execute a reverse operation generation process for generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order, a first procedure generation process for generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order, a planning process for planning an operation procedure for transitioning, from an arbitrary state during execution of the update procedure to the current state, the state of a state element which corresponds to a part of the update procedure that includes operations for which a reverse operation cannot be generated, and a second procedure generation process for generating a rollback procedure by combining the generated reverse execution procedure and the planned procedure.

In an exemplary embodiment of the present invention, a computer-readable recording medium stores a system update program causing, when executed by a computer, the computer to execute generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order, generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order, planning an operation procedure for transitioning, from an arbitrary state during execution of the update procedure to the current state, the state of a state element which corresponds to a part of the update procedure that includes operations for which a reverse operation cannot be generated, and generating a rollback procedure by combining the generated reverse execution procedure and the planned procedure.

Advantageous Effects of Invention

According to the present invention, it is possible to reduce the resource amount required to prepare rollback procedures.

BRIEF DESCRIPTION OF DRAWINGS

FIG. 5 is an explanatory diagram showing an example of a task execution order adjustment process by an execution order adjustment unit 112.

DESCRIPTION OF EMBODIMENTS

First Exemplary Embodiment

Figure 1:
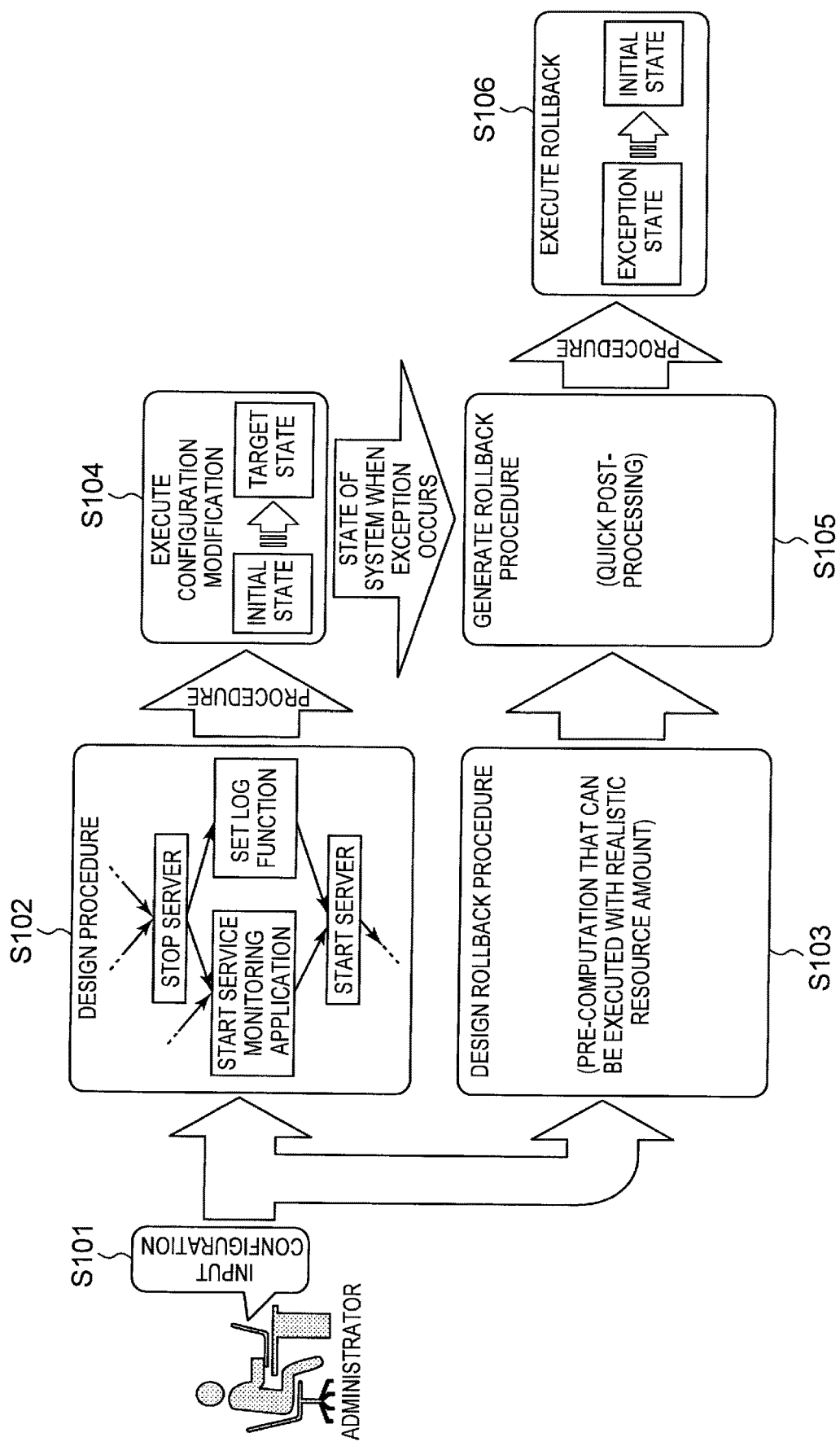
FIG. 1 is an explanatory diagram showing an example of a system update process by a system update device in a first exemplary embodiment.

Hereinafter, exemplary embodiments of the present invention will be described with reference to the drawings. FIG. 1 is an explanatory diagram showing an example of a system update process by a system update device in a first exemplary embodiment.

Figure 33:
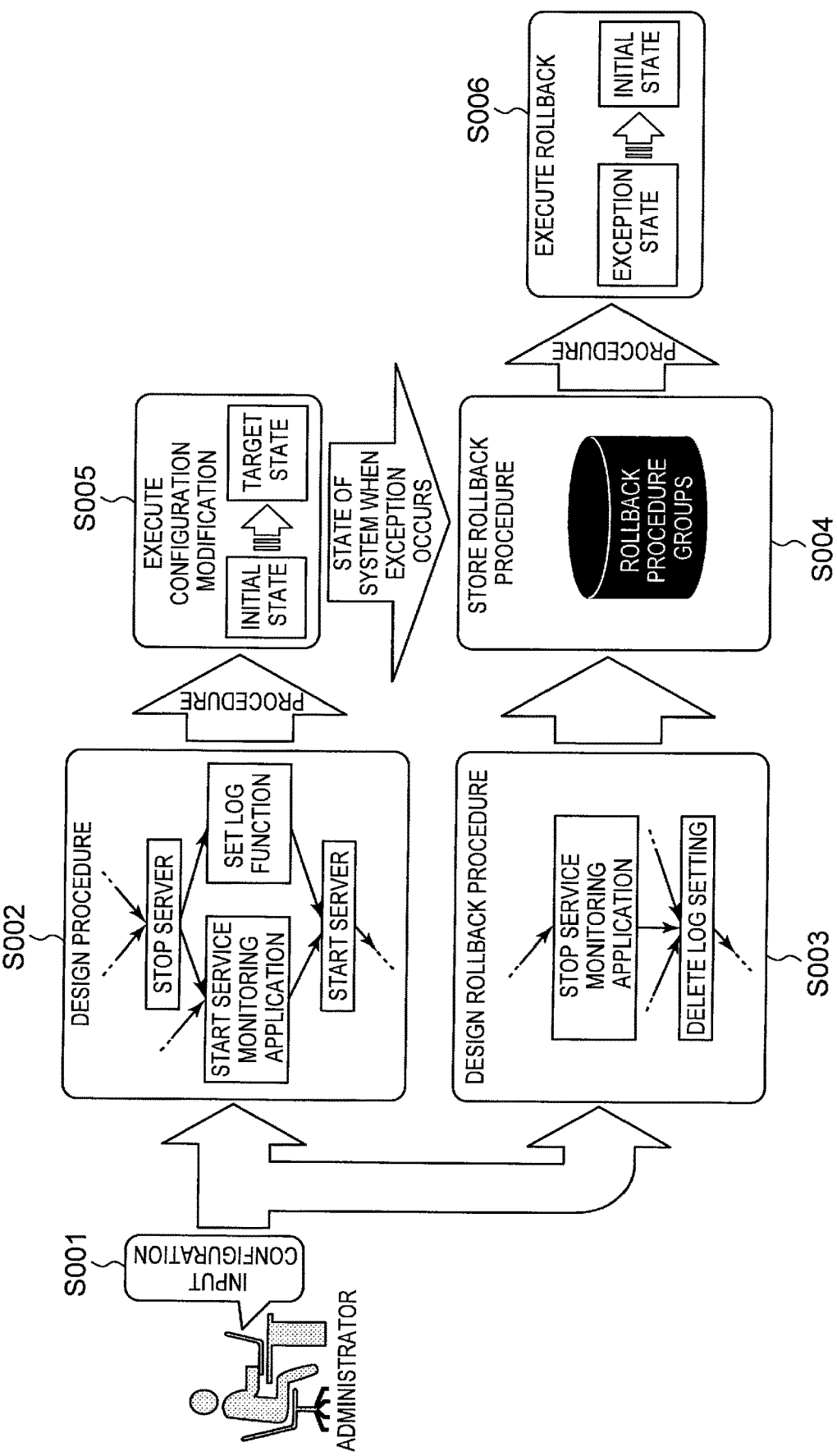
FIG. 33 is an explanatory diagram showing an example of a system update process by a system update device.

The processes of step S101, step S102, step S104, and step S106 shown in FIG. 1 are the same as the processes of step S001, step S002, step S005, and step S006 shown in FIG. 33, respectively. The processes of step S103 and step S105 shown in FIG. 1 are characteristic processes of the system update device in the present exemplary embodiment.

The system update device in the present exemplary embodiment designs rollback procedures for all points at which an exception can occur during an update operation (step S103). However, rollback procedures designed in step S103 are procedures computed in a computation process that can be executed with a realistic resource amount. As described later, the rollback procedures designed in step S103 can include inappropriate procedures.

In addition, the system update device in the present exemplary embodiment combines, when an exception occurs during execution of an update operation procedure, procedures as described later according to the rollback procedure designed in step S103 corresponding to the state of the system when the exception occurs (step S105). With the process of step S105, the rollback procedure is quickly prepared.

With the system update process shown in FIG. 1, the system update device in the present exemplary embodiment can quickly handle all states of the system when an exception occurs, without preparing each rollback procedure in advance. Hereinafter, the configuration and operation of the system update device in the present exemplary embodiment that executes the processes of steps S101 to S106 will be described with reference to the drawings.

[Description of Configuration]

Figure 2:
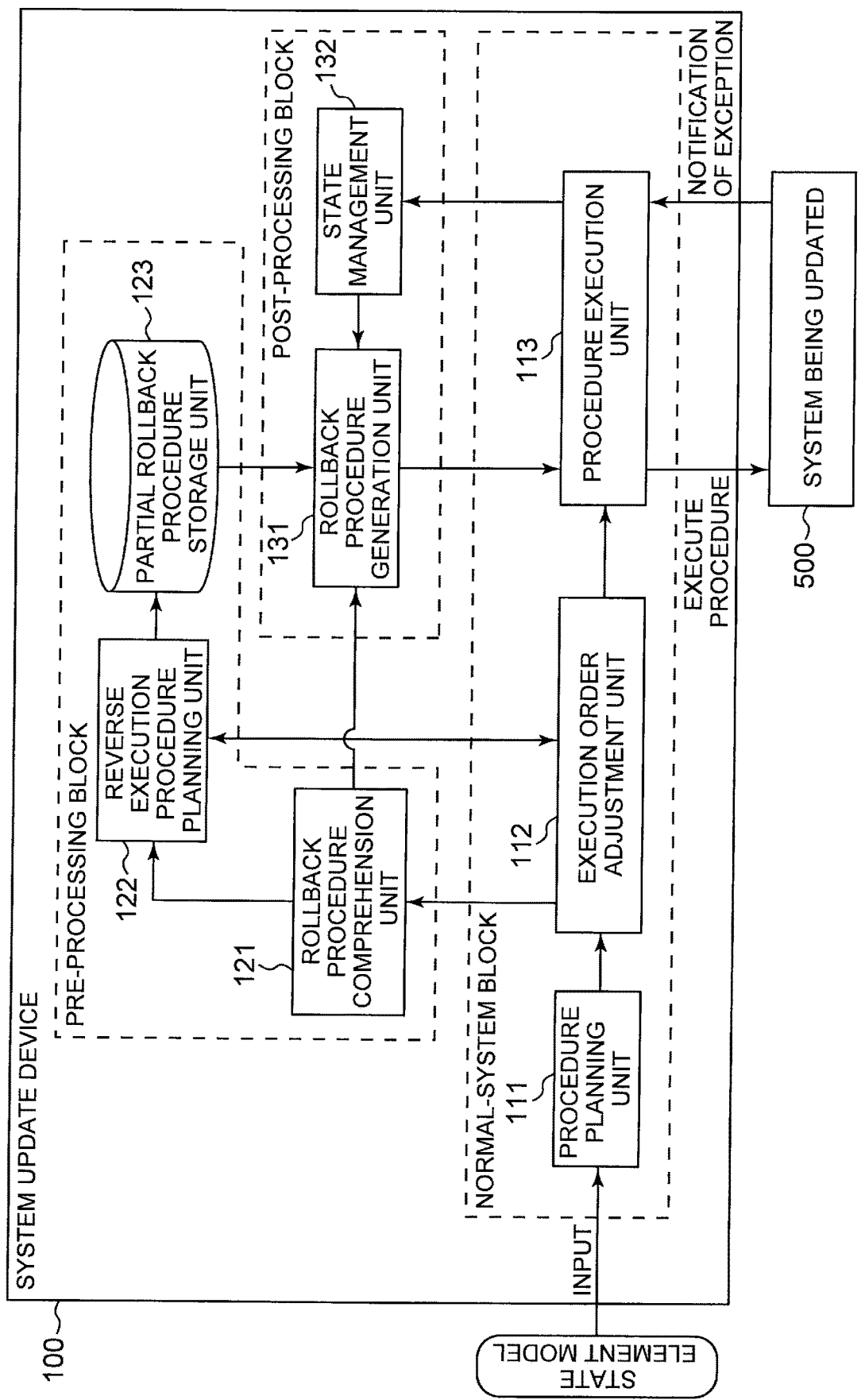
FIG. 2 is a block diagram showing a configuration example of the system update device in the first exemplary embodiment of the present invention.

FIG. 2 is a block diagram showing a configuration example of the system update device in the first exemplary embodiment of the present invention. As shown in FIG. 2, a system update device 100 in the present exemplary embodiment includes a normal-system block, a pre-processing block, and a post-processing block.

The unidirectional arrows shown in the block diagram each indicate the direction in which data (information) flows. However, the possibility that data flows bidirectionally at the positions where the arrows are shown is not excluded.

As shown in FIG. 2, the normal-system block includes a procedure planning unit 111, an execution order adjustment unit 112, and a procedure execution unit 113. The procedure planning unit 111 has a function of planning a procedure on the basis of input state element models. That is, the procedure planning unit 111 executes the process of step S102 shown in FIG. 1.

The execution order adjustment unit 112 has a function of adjusting the execution order of tasks constituting the procedure designed by the procedure planning unit 111. In addition, the procedure execution unit 113 has a function of executing, for a system being updated 500, the procedure in which the task execution order has been adjusted by the execution order adjustment unit 112. That is, the procedure execution unit 113 executes the process of step S104 and the process of step S106 shown in FIG. 1.

The procedure execution unit 113 is communicably connected to the system being updated 500. If an exception occurs in the system being updated 500 during execution of the procedure, the procedure execution unit 113 is notified that the exception has occurred. The occurrence of the exception is notified to the procedure execution unit 113 by manual confirmation, an external system monitoring service, or the like. Alternatively, the system being updated 500 itself may notify the procedure execution unit 113 of the occurrence of the exception.

As shown in FIG. 2, the pre-processing block includes a rollback procedure comprehension unit 121, a reverse execution procedure planning unit 122, and a partial rollback procedure storage unit 123.

The rollback procedure comprehension unit 121 has a function of controlling the reverse execution procedure planning unit 122 and the partial rollback procedure storage unit 123 in order to prepare rollback procedures in advance for all points at which an exception can occur.

The reverse execution procedure planning unit 122 has a function of planning a reverse execution procedure to be used as the rollback procedure corresponding to a state that can occur during execution of an update operation procedure. The reverse execution procedure planning unit 122 plans a reverse execution procedure on the basis of the procedure in which the task execution order is adjusted by the execution order adjustment unit 112. The specific content of the reverse execution procedure will be described later.

The partial rollback procedure storage unit 123 has a function of storing a partial rollback procedure designed by the reverse execution procedure planning unit 122. That is, each constituent element of the pre-processing block performs the process of step S103 shown in FIG. 1.

As shown in FIG. 2, the post-processing block includes a rollback procedure generation unit 131 and a state management unit 132. The rollback procedure generation unit 131 has a function of generating a rollback procedure corresponding to the current state of the system being updated 500 during execution of the update operation procedure.

Specifically, the rollback procedure generation unit 131 acquires, according to the current state, the partial rollback procedure and the reverse execution procedure from the partial rollback procedure storage unit 123. Then, the rollback procedure generation unit 131 generates a rollback procedure by combining the acquired partial rollback procedure and reverse execution procedure. The rollback procedure generation unit 131 inputs the generated rollback procedure to the procedure execution unit 113.

The state management unit 132 has a function of managing the current state of the system being updated 500 during execution of the update operation procedure. The current state is the latest state of the system being updated 500. That is, each constituent element of the post-processing block performs the process of step S105 shown in FIG. 1.

In the following, the process of step S103 shown in FIG. 1 and the process of step S105 shown in FIG. 1 will be specifically described with reference to FIGS. 3 to 8.

The system update device 100 in the present exemplary embodiment uses the feature that a rollback procedure can be generated by arranging "reverse tasks" of tasks constituting a normal procedure in the "reverse order" of the normal procedure (hereinafter, referred to as reverse execution) in many cases. The reverse execution procedure in the present exemplary embodiment is a procedure generated by this method.

Figure 3:
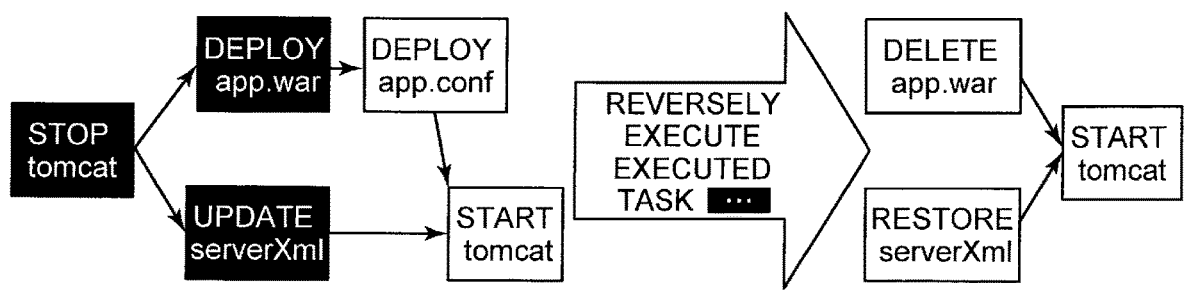
FIG. 3 is an explanatory diagram showing an example of a rollback procedure generation process in the present exemplary embodiment.

FIG. 3 is an explanatory diagram showing an example of a rollback procedure generation process in the present exemplary embodiment. One rectangle shown in FIG. 3 represents one task. The white rectangles represent unexecuted tasks. The black tasks represent executed tasks. Each arrow shown in FIG. 3 extends from a task to be executed earlier to a task to be executed later.

The left of FIG. 3 shows a procedure in the middle of execution. Specifically, the left of FIG. 3 shows a state in which an exception has occurred immediately before the task "deploy app.conf" is executed.

The rollback procedure for returning the state shown in the left of FIG. 3 to the initial state is generated by reversely executing the executed tasks. The right of FIG. 3 shows a rollback procedure generated by reverse execution.

The task "delete app.war", the task "restore serverXml", and the task "start tomcat" shown in the right of FIG. 3 are the reverse tasks of the task "deploy app.war", the task "update serverXml", and the task "stop tomcat" shown in the left of FIG. 3. In the rollback procedure shown in the right of FIG. 3, the reverse tasks are arranged in the reverse order of the procedure shown in the left of FIG. 3.

With the method for generating the rollback procedure on the basis of the tasks executed before the occurrence of the exception, the consumed resource amount is reduced as compared to the method for generating the rollback procedure corresponding to each state in advance. The system update device 100 in the present exemplary embodiment basically generates the rollback procedure with the above method.

Figure 4:
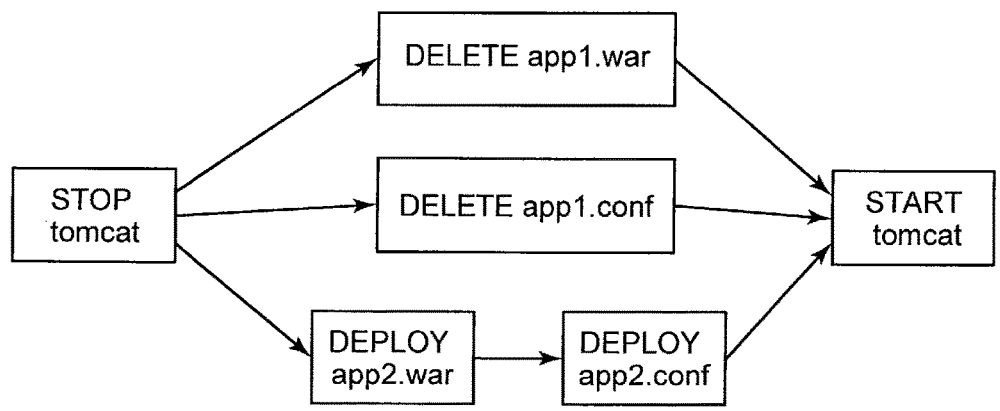
FIG. 4 is an explanatory diagram showing an example of an update operation procedure.

However, in some cases, the rollback procedure cannot be generated by simply arranging "reverse tasks" as described above. FIG. 4 is an explanatory diagram showing an example of an update operation procedure.

In the procedure shown in FIG. 4, when rollback is performed, for example, from the time when app1.war and app1.conf are deleted, it is required to deploy them in the order of war->conf. However, it is difficult to generate the rollback procedure in consideration of the above order by simple reverse execution.

In addition, if appropriate operations are not complemented when access to an external repository is required to deploy app1.war, the task "deploy app1.war", which is the reverse task of the task "app1.war delete", cannot be executed.

Thus, the system update device 100 in the present exemplary embodiment generates the rollback procedure with the policy of increasing the number of reversely-executable tasks as much as possible and planning the partial rollback procedure only for reversely-un-executable tasks.

The processes of the constituent elements of the pre-processing block based on the above policy will be described. The execution order adjustment unit 112 adjusts the execution order of the tasks constituting the update operation procedure in a manner such that the rollback procedure can be generated by reverse execution. FIG. 5 is an explanatory diagram showing an example of a task execution order adjustment process by the execution order adjustment unit 112.

The procedure shown in the upper of FIG. 5 is the update operation procedure shown in FIG. 4. As described above, when app1.war and app1.conf are deleted, it is required to deploy them in the order of war->conf. The execution order adjustment unit 112 adjusts the execution order of the tasks as shown in the lower of FIG. 5 in a manner such that the above order is taken into consideration in the rollback procedure to be generated by the simple reverse execution.

The lower of FIG. 5 shows a procedure in which the execution order of the tasks shown in the upper of FIG. 5 is adjusted. Specifically, the execution order adjustment unit 112 rearranges the task "delete app1.war" and the task "delete app1.conf" that can be executed in parallel so as to execute the task "delete app1.conf"->the task "delete app1.war" in this order. The outlined arrow shown in the lower of FIG. 5 represents the adjusted execution order.

Figure 6:
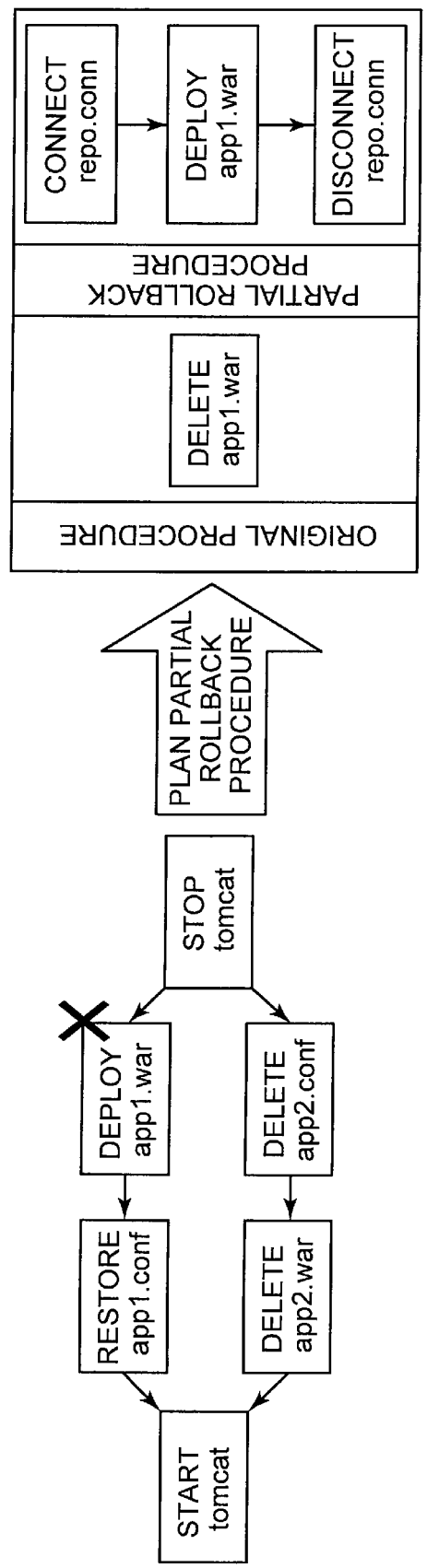
FIG. 6 is an explanatory diagram showing an example of a partial rollback procedure planning process by a reverse execution procedure planning unit 122.

In addition, the reverse execution procedure planning unit 122 plans a partial rollback procedure in advance only for a reversely-un-executable task although the execution order is adjusted. FIG. 6 is an explanatory diagram showing an example of a partial rollback procedure planning process by the reverse execution procedure planning unit 122.

The left of FIG. 6 shows a reverse execution procedure generated by reverse execution of the entire procedure shown in the lower of FIG. 5. The reason that "x" is added to the task "deploy app1.war" is that the task cannot be executed due to the above reason.

Thus, the reverse execution procedure planning unit 122 plans a partial rollback procedure that is a partial rollback procedure for the task "delete app1.war". As shown in the right of FIG. 6, the reverse execution procedure planning unit 122 plans the procedure of the task "connect repo.conn"->the task "deploy app1.war"->the task "disconnect repo.conn" as a partial rollback procedure. The reverse execution procedure planning unit 122 stores the original procedure and the planned partial rollback procedure in the partial rollback procedure storage unit 123 in association with each other.

Figure 7:
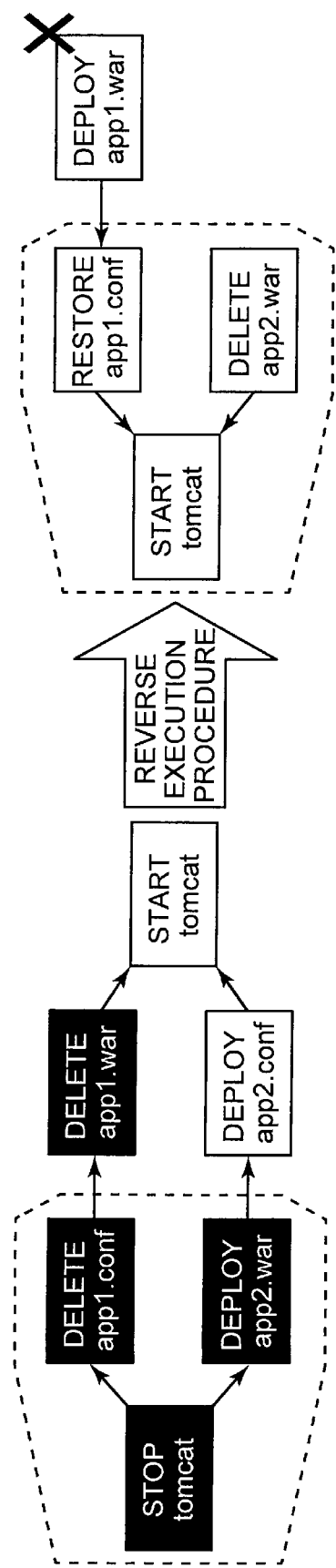
FIG. 7 is an explanatory diagram showing an example of a rollback procedure generation process by a rollback procedure generation unit 131.

Next, the processes of the constituent elements of the post-processing block based on the above policy will be described. FIG. 7 is an explanatory diagram showing an example of a rollback procedure generation process by the rollback procedure generation unit 131.

The left of FIG. 7 shows a procedure in the middle of execution. Specifically, the left of FIG. 7 shows a state in which an exception occurs immediately after the task "delete app1.war" is executed. The area enclosed by the broken line shown in the left of FIG. 7 represents the part of the reversely-executable procedure.

The rollback procedure generation unit 131 generates the reverse execution procedure shown in the right of FIG. 7 by reversely executing the executed tasks. The area enclosed by the broken line shown in the right of FIG. 7 includes the procedure generated by reversely executing the part of the reversely-executable procedure. Note that, "x" is added to the task "deploy app1.war" that is a reversely-un-executable task.

Figure 8:
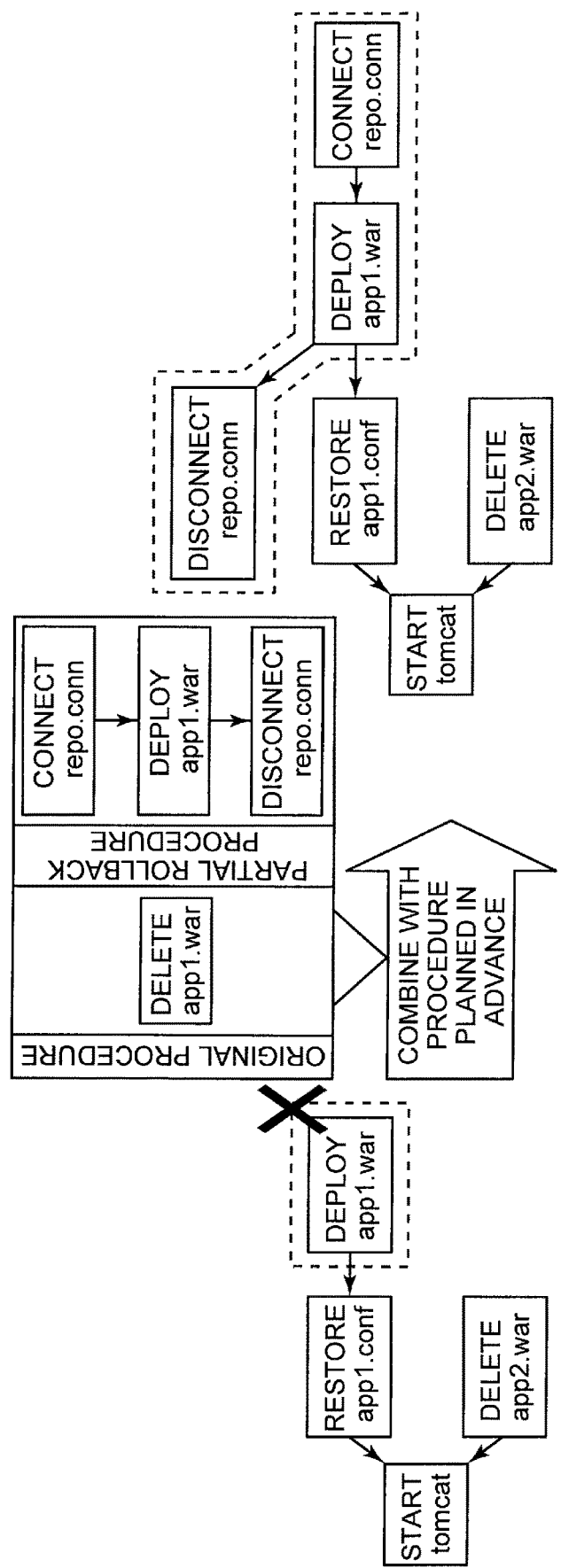
FIG. 8 is an explanatory diagram showing another example of the rollback procedure generation process by the rollback procedure generation unit 131.

FIG. 8 is an explanatory diagram showing another example of the rollback procedure generation process by the rollback procedure generation unit 131. The procedure shown in the left of FIG. 8 is the reverse execution procedure shown in the right of FIG. 7. The area enclosed by the broken line shown in the left of FIG. 8 represents the part of the reversely-un-executable procedure.

The rollback procedure generation unit 131 acquires the partial rollback procedure planned in advance from the partial rollback procedure storage unit 123 using the original procedure as a key. Then, the rollback procedure generation unit 131 combines the acquired partial rollback procedure and the reverse execution procedure.

The right of FIG. 8 shows a procedure in which the two procedures are combined, that is, a generation target rollback procedure. The area enclosed by the broken line shown in the right of FIG. 8 includes the partial rollback procedure. As described above, the system update device 100 in the present exemplary embodiment prepares the rollback procedure.

Figure 9:
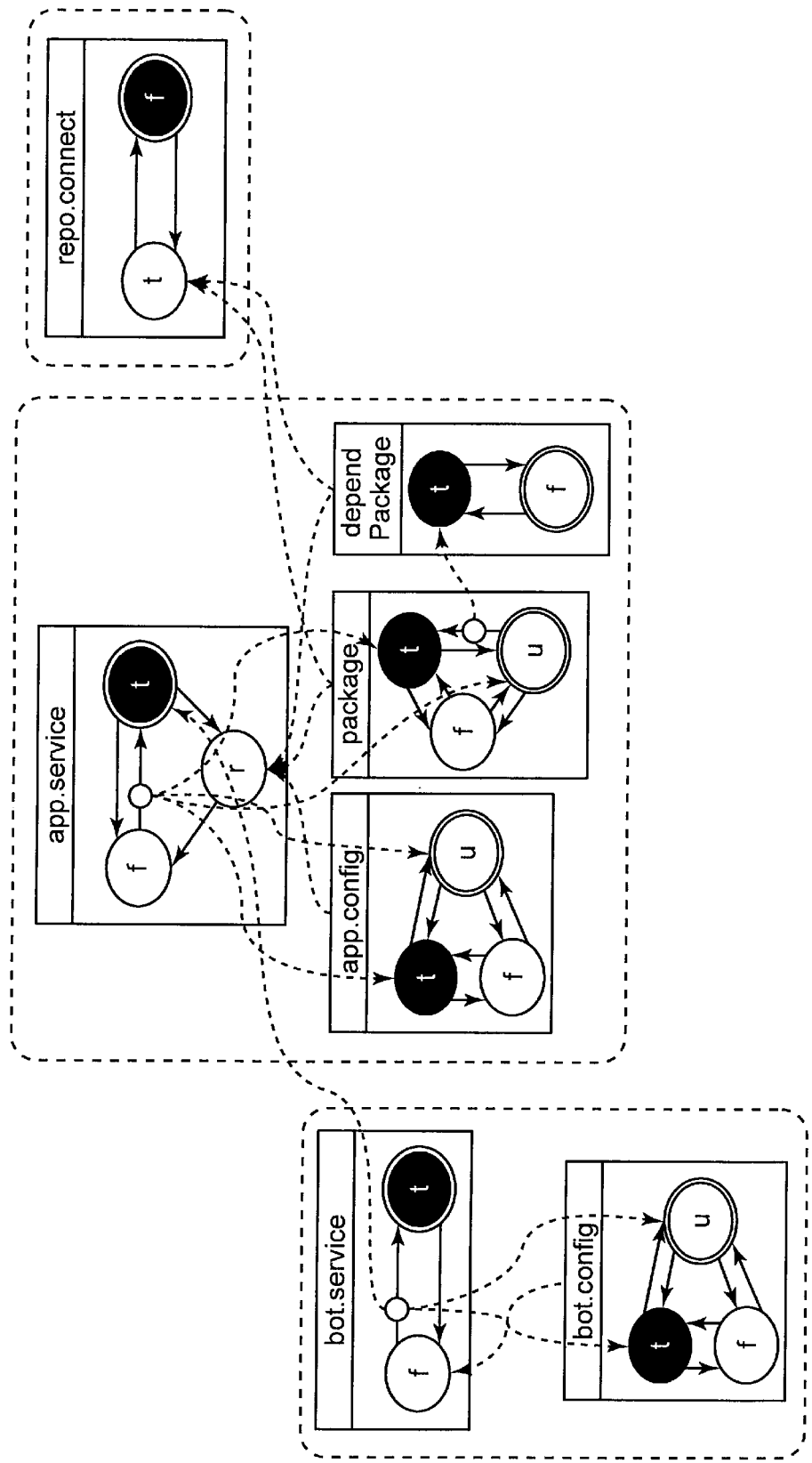
FIG. 9 is an explanatory diagram showing examples of state element models input to a procedure planning unit 111.

In the following, a specific example in which the system update device 100 in the present exemplary embodiment prepares a rollback procedure will be described with reference to FIGS. 9 to 20. FIG. 9 is an explanatory diagram showing examples of state element models input to the procedure planning unit 111.

The state element models shown in FIG. 9 represent the system being updated 500. The rectangles shown in FIG. 9 represent state elements. Each state element represents each component of the system being updated 500.

The ellipses in the state elements shown in FIG. 9 represent the states of the state elements. The double-lined ellipses represent the current states. The black ellipses represent the target states. Each arrow between the ellipses represents state transition. The procedure planning unit 111 plans, on the basis of the input state element models, an update operation procedure for transitioning the state of each state element from the current state to the target state.

In addition, each dashed arrow shown in FIG. 9 represents dependency. Each white circle shown in FIG. 9 represents the start point of dependency. An arrow whose start point is attached to the state element itself and whose end point is attached to an arbitrary state represents dependency from all of the state transition in the state element to the arbitrary state.

For example, the dependency from the state transition t of the state element E1 to the state s of the state element E2 indicates that the execution of the state transition t depends on the state s. That is, the state element E1 can execute the state transition t only when the state of the state element E2 is the state s.

In addition, the dashed-lined rounded quadrangles shown in FIG. 9 each represent a group generated by the procedure planning unit 111 dividing the input state element models. The procedure planning unit 111 plans an update operation procedure on the basis of the input state element models.

Figure 10:
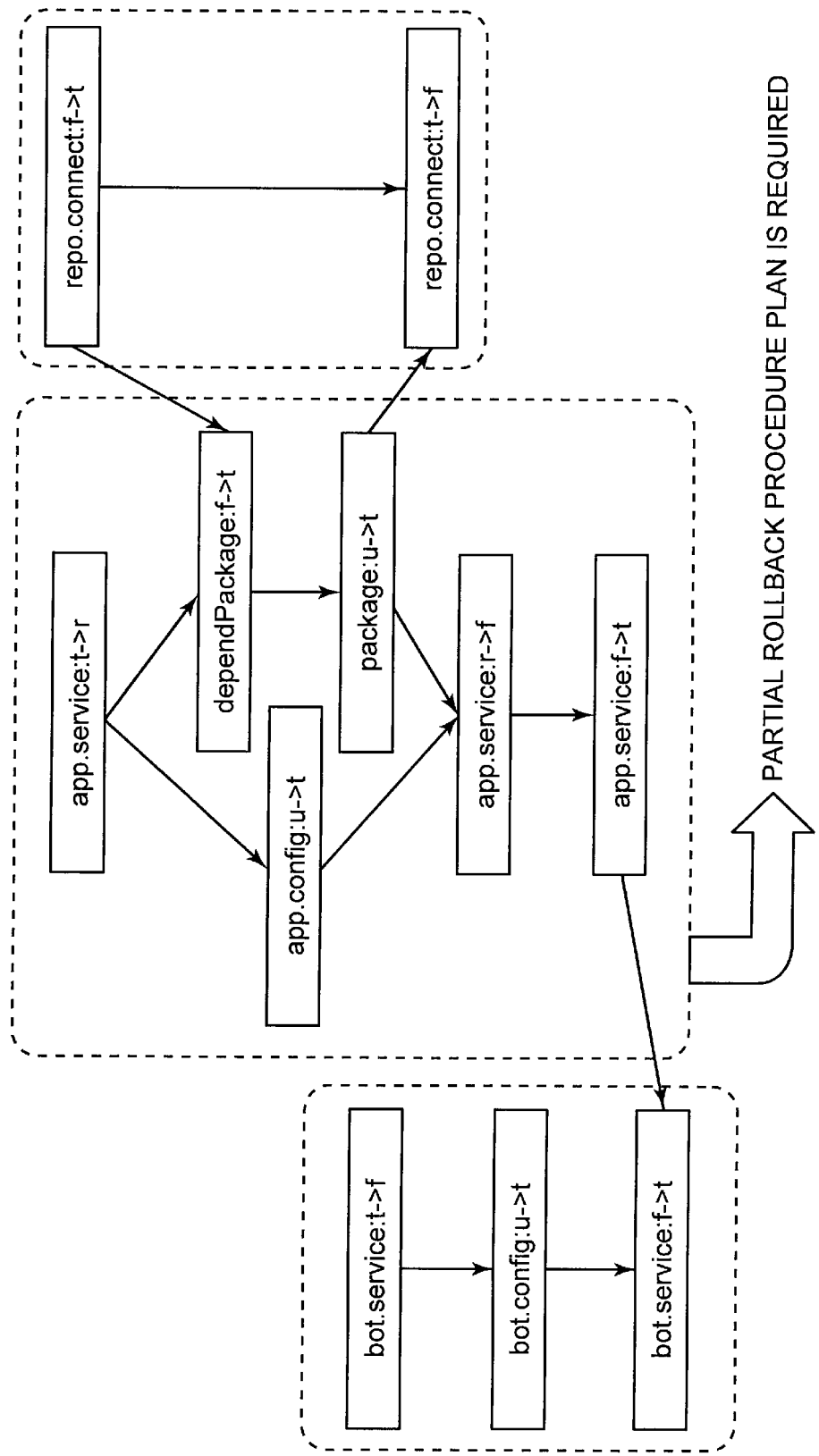
FIG. 10 is an explanatory diagram showing an example of an update operation procedure planned by the procedure planning unit 111.

FIG. 10 is an explanatory diagram showing an example of the update operation procedure planned by the procedure planning unit 111. The update operation procedure shown in FIG. 10 is a procedure for transitioning the current state of each state element model shown in FIG. 9 to the target state.

Figure 34:
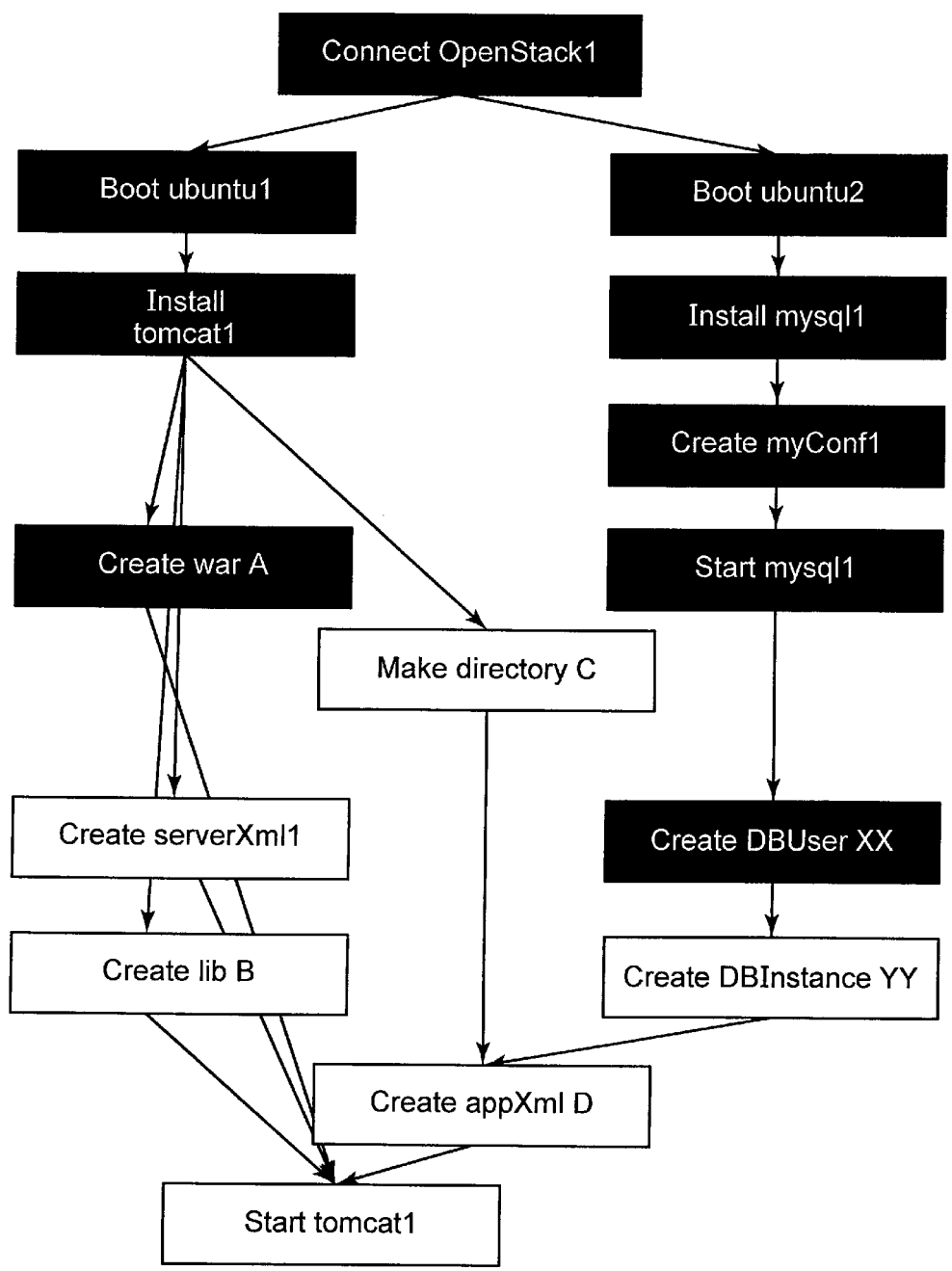
FIG. 34 is an explanatory diagram showing an example of a partially-ordered procedure.

The broken-line rounded rectangles shown in FIG. 10 correspond to the respective groups shown in FIG. 9. Each rectangle and arrow shown in FIG. 10 have the same meanings as each rectangle and arrow shown in FIG. 34, respectively. For example, the task "bot.service:t->f" is a task to "transition the state of the state element bot.service from state t to state f".

The procedure planning unit 111 inputs the planned update operation procedure to the reverse execution procedure planning unit 122. The reverse execution procedure planning unit 122 can generate a reverse execution procedure by simply reversely executing the procedure of the left group and the procedure of the right group shown in FIG. 10, which are input modification procedures in the forward direction.

However, the procedure of the center group shown in FIG. 10, which is the modification procedure in the forward direction, includes a task for the state element app.service, and the reverse execution procedure planning unit 122 cannot simply perform reverse execution for the above reason. Thus, as shown in FIG. 10, the reverse execution procedure planning unit 122 is required to plan a partial rollback procedure only for the procedure of the center group.

Figure 11:
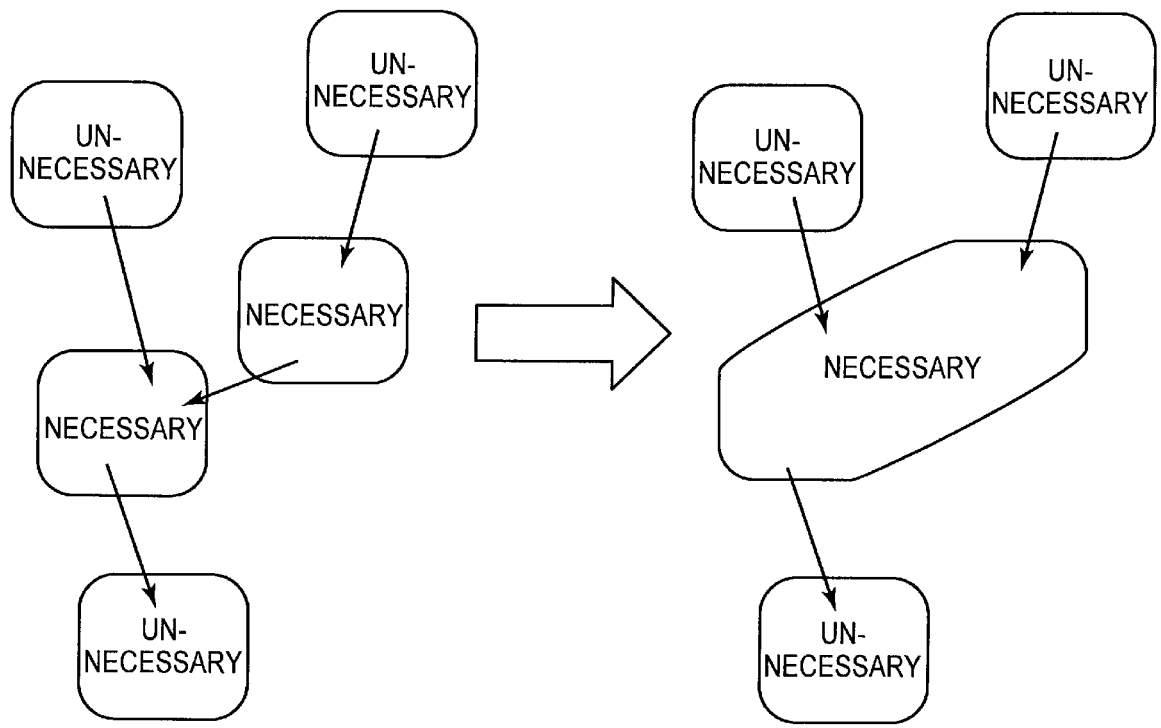
FIG. 11 is an explanatory diagram showing an example of an integration process by the reverse execution procedure planning unit 122 for the procedure of each group.

When the groups for which the partial rollback procedure plan is required are adjacent to each other, the following pre-process is required to be performed. FIG. 11 is an explanatory diagram showing an example of an integration process by the reverse execution procedure planning unit 122 for the procedure of each group. Each rounded quadrangle with "unnecessary" shown in FIG. 11 represents a procedure of a group for which a partial rollback procedure plan is not required. Each rounded quadrangle with "necessary" shown in FIG. 11 represents a group procedure for which a partial rollback procedure plan is required.

If groups for which partial rollback procedure plans are required are adjacent to each other, inconvenience can occur in subsequent procedures. Thus, as shown in FIG. 11, the reverse execution procedure planning unit 122 performs a pre-process for integrating the groups for which partial rollback procedure plans are required into one group.

Figure 12:
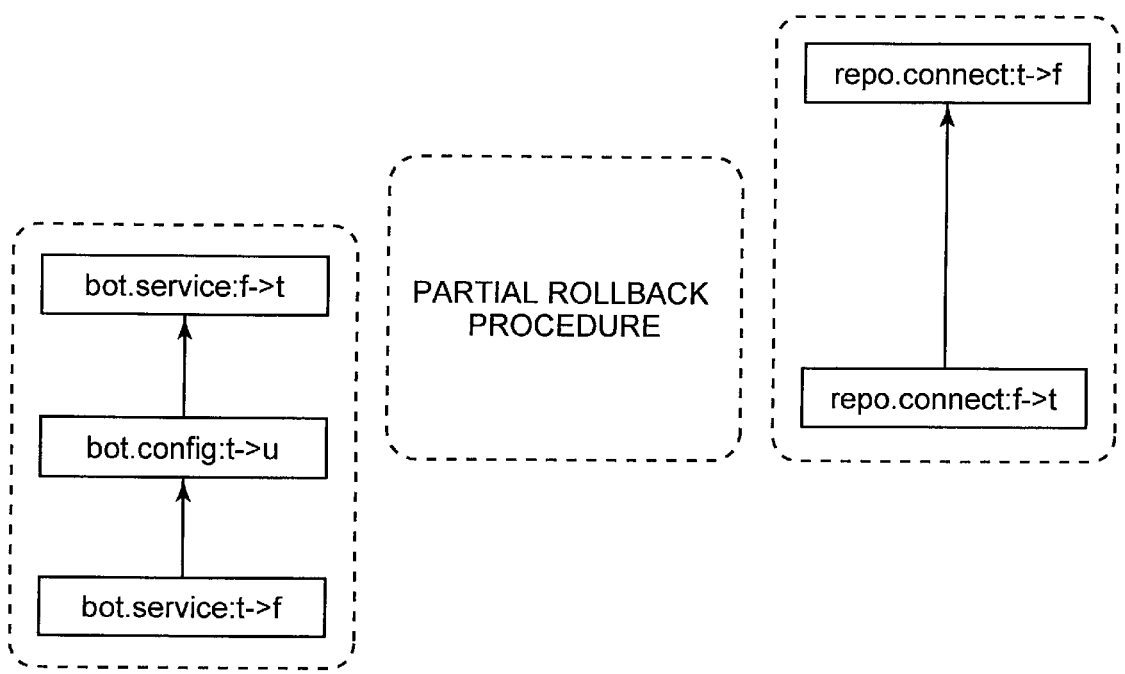
FIG. 12 is an explanatory diagram showing an example of a reverse execution procedure planned by the reverse execution procedure planning unit 122.

FIG. 12 is an explanatory diagram showing an example of a reverse execution procedure planned by the reverse execution procedure planning unit 122. The broken-line rounded quadrangles shown in FIG. 12 correspond to the respective groups shown in FIG. 10. As described above, the reverse execution procedure of the left group and the reverse execution procedure of the right group shown in FIG. 12 are generated by simply reversely executing the procedure of the left group and the procedure of the right group shown in FIG. 10.

For example, the task "bot.service:t->f" shown in FIG. 10 is modified to the task "bot.service:f->t" shown in FIG. 12. In addition, the directions of the arrows shown in FIG. 12 are opposite to the directions of the arrows shown in FIG. 10. That is, the reverse execution procedure of the left group and the reverse execution procedure of the right group are the procedures planned by normal reverse execution.

The execution order adjustment unit 112 executes an execution order complementation process for the reverse execution procedure whose execution order is required to be adjusted among the reverse execution procedures generated as the reverse execution procedure shown in FIG. 12.

Figure 13:
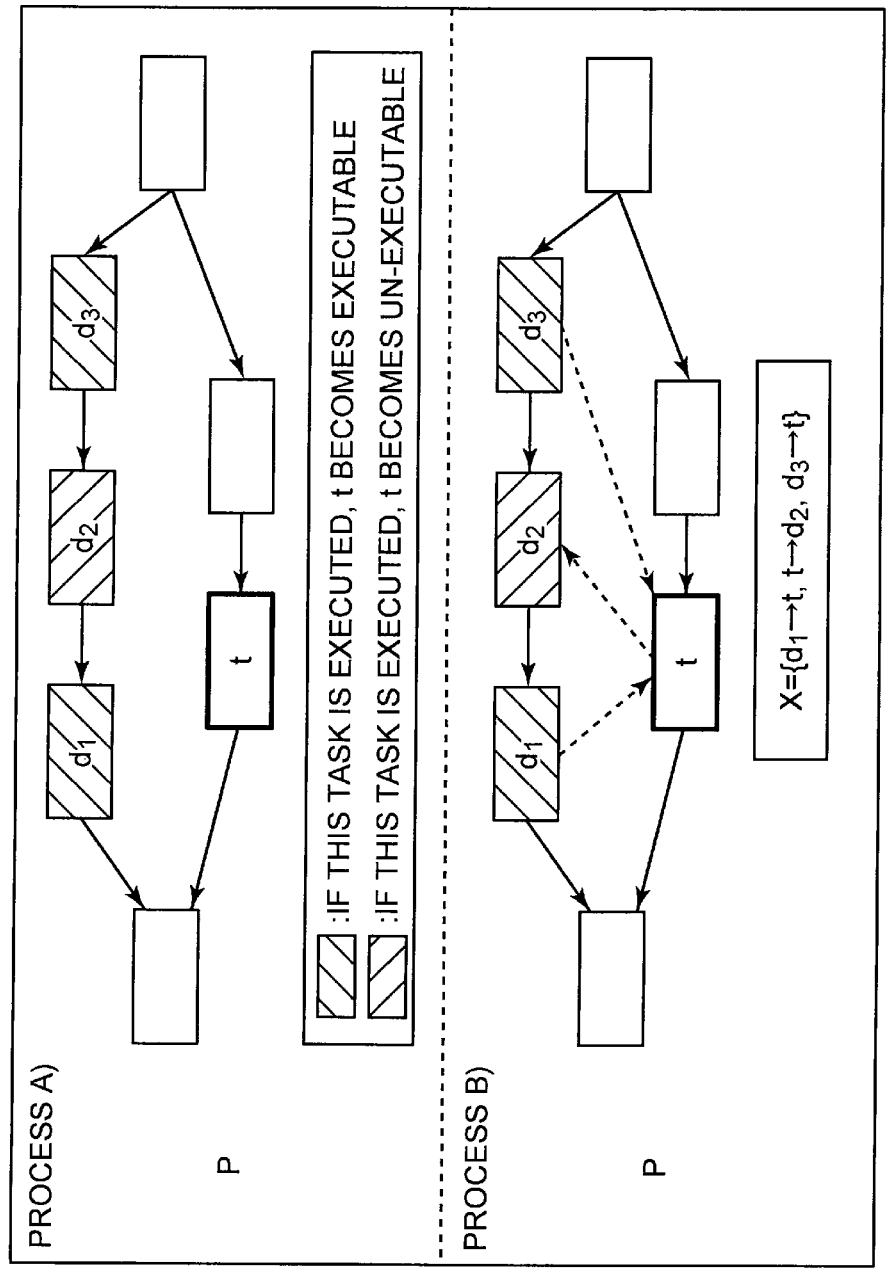
FIG. 13 is an explanatory diagram showing an example of an order-relation-candidate collection process by the execution order adjustment unit 112.

The process for generating a system reverse execution procedure P' from a system reverse execution procedure P by the execution order adjustment unit 112 executing the execution order complementation process will be described below with reference to FIGS. 13 to 15. FIG. 13 is an explanatory diagram showing an example of an order-relation-candidate collection process by the execution order adjustment unit 112.

The procedure P shown in FIG. 13 is a reverse execution procedure. The task t is a reversely-un-executable task. First, the execution order adjustment unit 112 executes a process A and a process B shown in FIG. 13 for the task t.

In the process A, the execution order adjustment unit 112 enumerates task groups $d_1, d_2, \ldots,$ and $d_n$ that satisfy the following two conditions.

(1) Executable in parallel with task t
(2) To affect the executable condition of task t In the process A shown in FIG. 13, a task $d_1$, a task dz, and a task $d_3$ are enumerated as task groups. The reason is that any task can be executed in parallel with task t. When the task $d_1$ and the task $d_3$ are executed, the task t becomes executable. In addition, when the task dz is executed, the task t becomes un-executable. That is, any task affects the executable condition of the task t.

Next, in the process B, the execution order adjustment unit 112 generates a set $X(t, d_i)$ of order relation candidates that is drawn between the task t and the task $d_i(i=1, \ldots, n)$. The set X includes the candidate "t->$d_i$" and the candidate "$d_i$->t".

When the influence on the above executable conditions is taken into consideration, "$d_1$->t" is drawn between the task t and the task $d_1$ as an order relation candidate. In addition, "t->$d_2$" is drawn between the task t and the task dz. In addition, "$d_3$->t" is drawn between the task t and the task $d_3$. Thus, the set X of the order relation candidates collected for all the tasks t by the above procedure is expressed by X={$d_1$->t, t->$d_2$, $d_3$->t} as shown in FIG. 13.

Then, the execution order adjustment unit 112 generates a constraint $C_{exe(t)}$ for all the tasks t to be "task t is executable". The timing at which the task t can be executed is one of the following timings with reference to the process B shown in FIG. 13.

1. After the task $d_1$ is executed
2. After the task $d_3$ is executed but before the task $d_2$ is executed If "adopting the order relation a->b" is described as [a->b], the constraint $C_{exe(t)}$ for being "task t is executable" is described as follows.

$$C_{exe(t)}=([d_1\text{->}t] \text{ OR } ([d_3\text{->}t] \text{ AND } [t\text{->}d_2])) \quad \text{Expression (1)}$$

Then, the execution order adjustment unit 112 generates a constraint $C_{ord}$ for being "the order relation of the procedure P is consistent". "The order relation is consistent" means that the following two rules are maintained.

1. (Asymmetric law) [a->b] and [b->a] must not hold at the same time
2. (Transitive law) If [a->b] and [b->c] hold, then [a->c] also holds Thus, the constraint $C_{ord}$ for being that the order relation of the procedure shown in FIG. 13 is consistent is described as follows.

$$C_{ord}=\text{NOT } ([t\text{->}d_2] \text{ AND } [d_1\text{->}t]) \quad \text{Expression (2)}$$

Note that, NPL 4 discloses a more complicated example of the expression of constraint $C_{exe(t)}$ and the expression of constraint $C_{ord}$.

Then, the execution order adjustment unit 112 adopts, as the procedure P', the minimum necessary order structure among the procedures that uses the constraint solver to satisfy $C_{ord}$ and as many $C_{exe(t)}$ as possible. The execution order adjustment unit 112 configures the procedure P' by adopting the minimum necessary order relation from the set X and adding it to the procedure P.

As the constraint solver, the MaxSAT solver disclosed in NPL 4 is used, for example. When the MaxSAT solver is used, partial ordering of the procedure is achieved. In addition, NPL 4 discloses an example of the above constraint.

Figure 14:
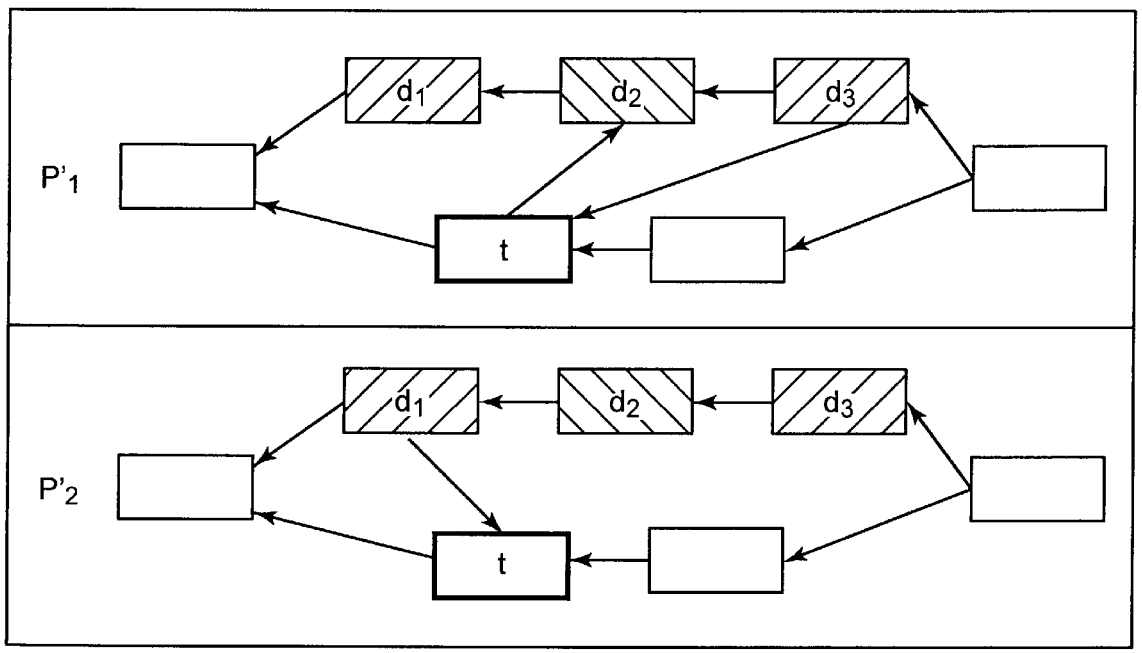
FIG. 14 is an explanatory diagram showing an example of a procedure in which an execution order is complemented by the execution order adjustment unit 112.

FIG. 14 is an explanatory diagram showing an example of a procedure in which the execution order is complemented by the execution order adjustment unit 112. Both the procedure P'$_1$ and the procedure P'$_2$ shown in FIG. 14 satisfy the constraint "$C_{exe(t)}$ and $C_{ord}$".

The procedure P'$_2$ shown in FIG. 14 has less ordering constrains than the procedure P'$_1$. That is, the execution order adjustment unit 112 adopts the procedure P'$_2$ having the minimum number of order relations as the system reverse execution procedure P'.

Figure 15:
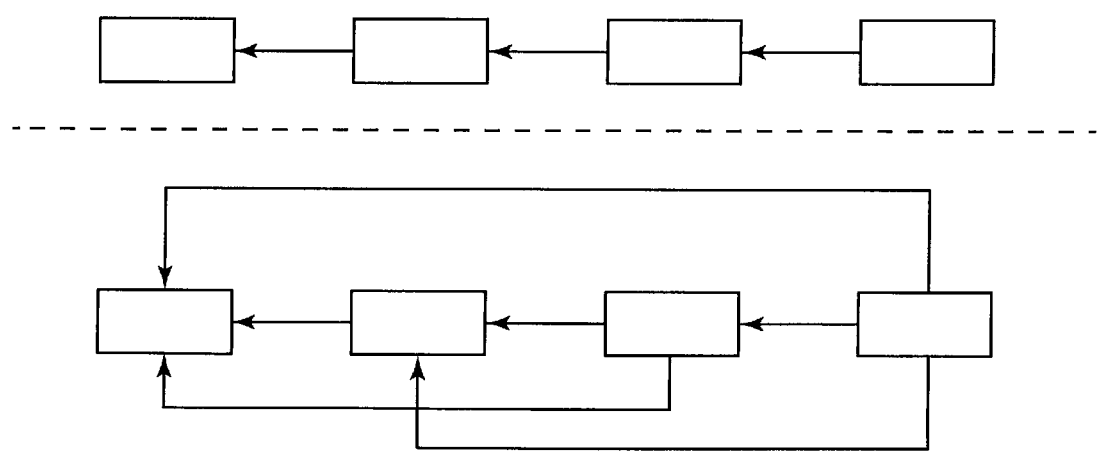
FIG. 15 is an explanatory diagram showing the number of order relations in a procedure.

FIG. 15 is an explanatory diagram showing the number of order relations in a procedure. The number of order relations in a procedure is the number of all the order relations between tasks. In the procedure in which only three arrows are drawn as shown in the upper of FIG. 15, the number of all the order relations between tasks is six, as shown in the lower of FIG. 15. The execution order adjustment unit 112 determines the system reverse execution procedure P by using the number of all the order relations between tasks.

In addition, the partial rollback procedure of the center group is not shown in FIG. 12. The reverse execution procedure planning unit 122 configures a procedure in which the execution order with the peripheral reverse execution procedures is taken into consideration and plans a correct partial rollback procedure as a whole.

In the following, the process for generating a partial rollback procedure reference table D from the partial procedure P by the reverse execution procedure planning unit 122 executing the partial rollback procedure planning process will be described with reference to FIGS. 16 to 20.

First, the reverse execution procedure planning unit 122 enumerates all execution situations S(S={$s_0, s_1, \ldots, s_n$}) that can occur when the reversely-un-executable partial procedure P is executed.

Figure 16:
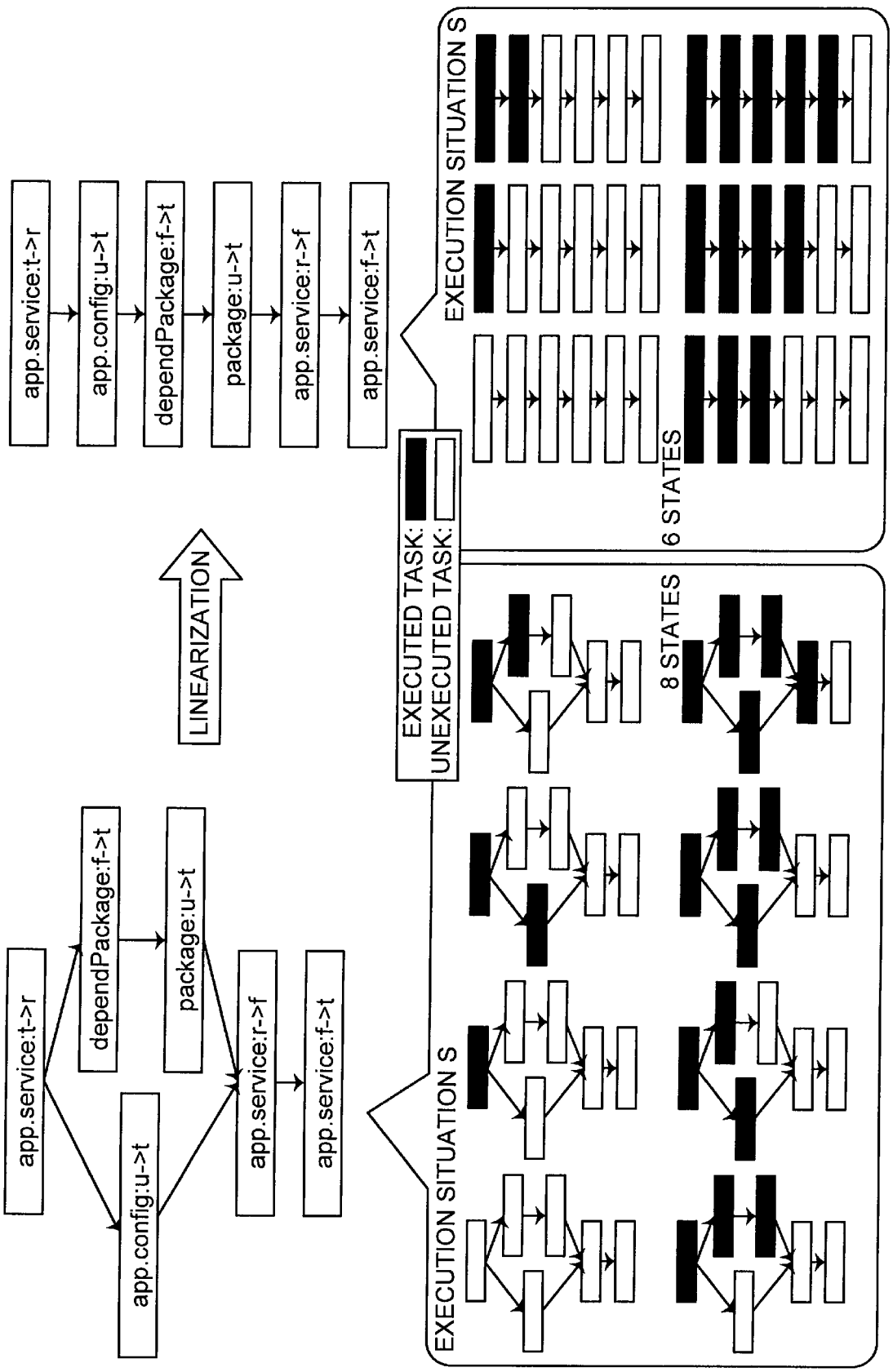
FIG. 16 is an explanatory diagram showing an example of a partial rollback procedure planning process by the reverse execution procedure planning unit 122.

FIG. 16 is an explanatory diagram showing an example of a partial rollback procedure planning process by the reverse execution procedure planning unit 122. The procedure shown in the upper part of the left of FIG. 16 is the procedure of the center group shown in FIG. 10.

The execution situation S is described in the balloon shown in the lower part of the left of FIG. 16. The white rectangles shown in the lower part of the left of FIG. 16 represent unexecuted tasks. The black rectangles represent executed tasks.

As shown in the lower part of the left of FIG. 16, the execution situation S includes eight situations. In order to reduce computation processing, it is required to minimize situations that can occur, and the reverse execution procedure planning unit 122 linearizes a part of the procedure. Specifically, the reverse execution procedure planning unit 122 transforms the reversely-un-executable partial procedure P into a linear procedure by adding an appropriate order relation.

The procedure shown in the upper part of the right of FIG. 16 is the procedure of the center group shown in FIG. 10, which is partially linearized. Specifically, the task "app.config:u->t" and the task "dependPackage:f->t" that can be executed in parallel in the left of FIG. 16 are rearranged in the order of the task "dependPackage:f->t"->the task "app.config:u->t" in the right of FIG. 16.

In addition, as shown in the lower part of the right of FIG. 16, the situations included in the execution situation S are reduced to six. Thus, the reverse execution procedure planning unit 122 plans a partial rollback procedure on the basis of the procedure shown in the upper part of the right of FIG. 16.

If the linearization is executed, the partial procedure P in the original update operation procedure is required to be also replaced with the linearized procedure. The linearization of a procedure may not be executed according to the procedure.

Figure 17:
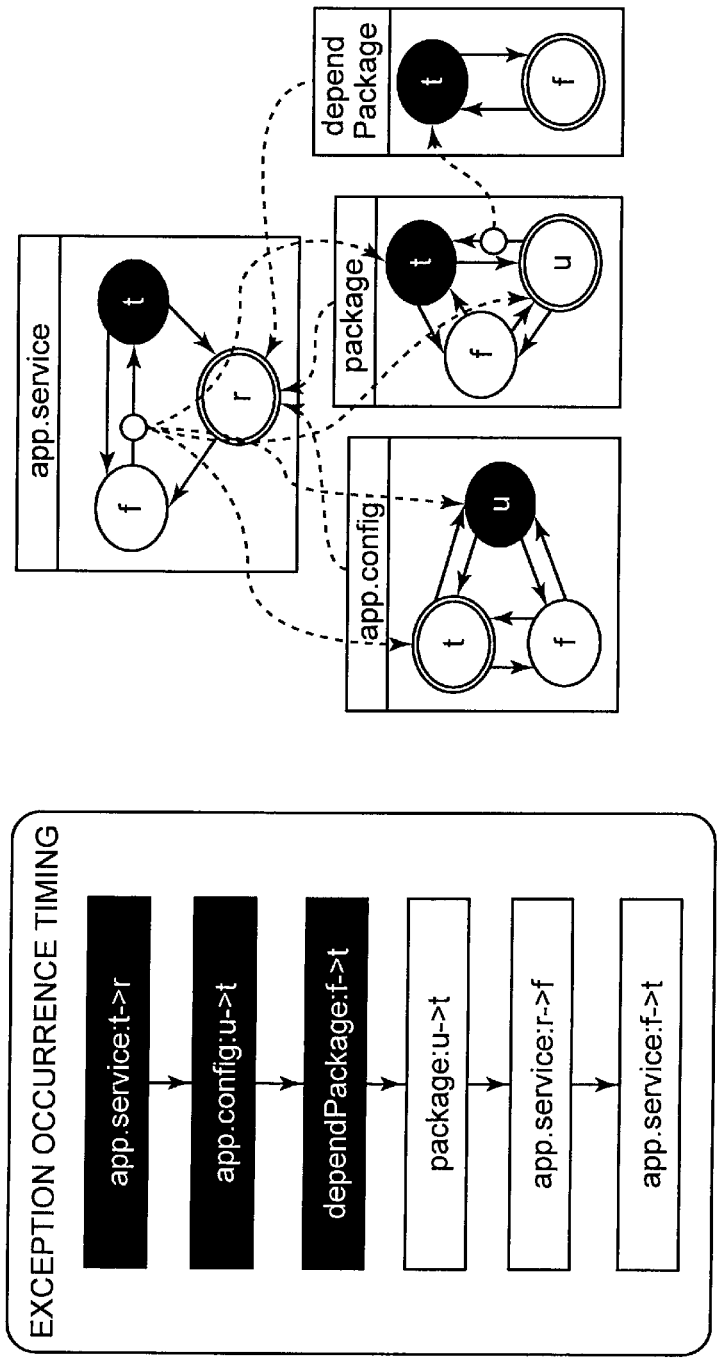
FIG. 17 is an explanatory diagram showing another example of the partial rollback procedure planning process by the reverse execution procedure planning unit 122.

Then, the reverse execution procedure planning unit 122 obtains, for each execution situation $s_i$, a partial rollback procedure $P_i$ for transitioning the state of the state model to the state before the partial procedure P is executed. FIG. 17 is an explanatory diagram showing another example of the partial rollback procedure planning process by the reverse execution procedure planning unit 122.

The left of FIG. 17 shows the execution situation of the procedure at the timing when an exception occurs. Specifically, the left of FIG. 17 shows the situation in which an exception occurs when the task "app.service:t->r"->the task "app.config:u->t"->the task "dependPackage:f->t" is executed.

For the situation in which the exception shown in the left of FIG. 17 occurs, the reverse execution procedure planning unit 122 obtains, as a partial rollback procedure, the solution of the configuration modification problem that the state of each state element model shown in the right of FIG. 17 is returned to the initial state. As described above, the reverse execution procedure planning unit 122 obtains, for each situation in which an exception has occurred, the partial rollback procedure for transitioning the state to the initial state.

Figure 18:
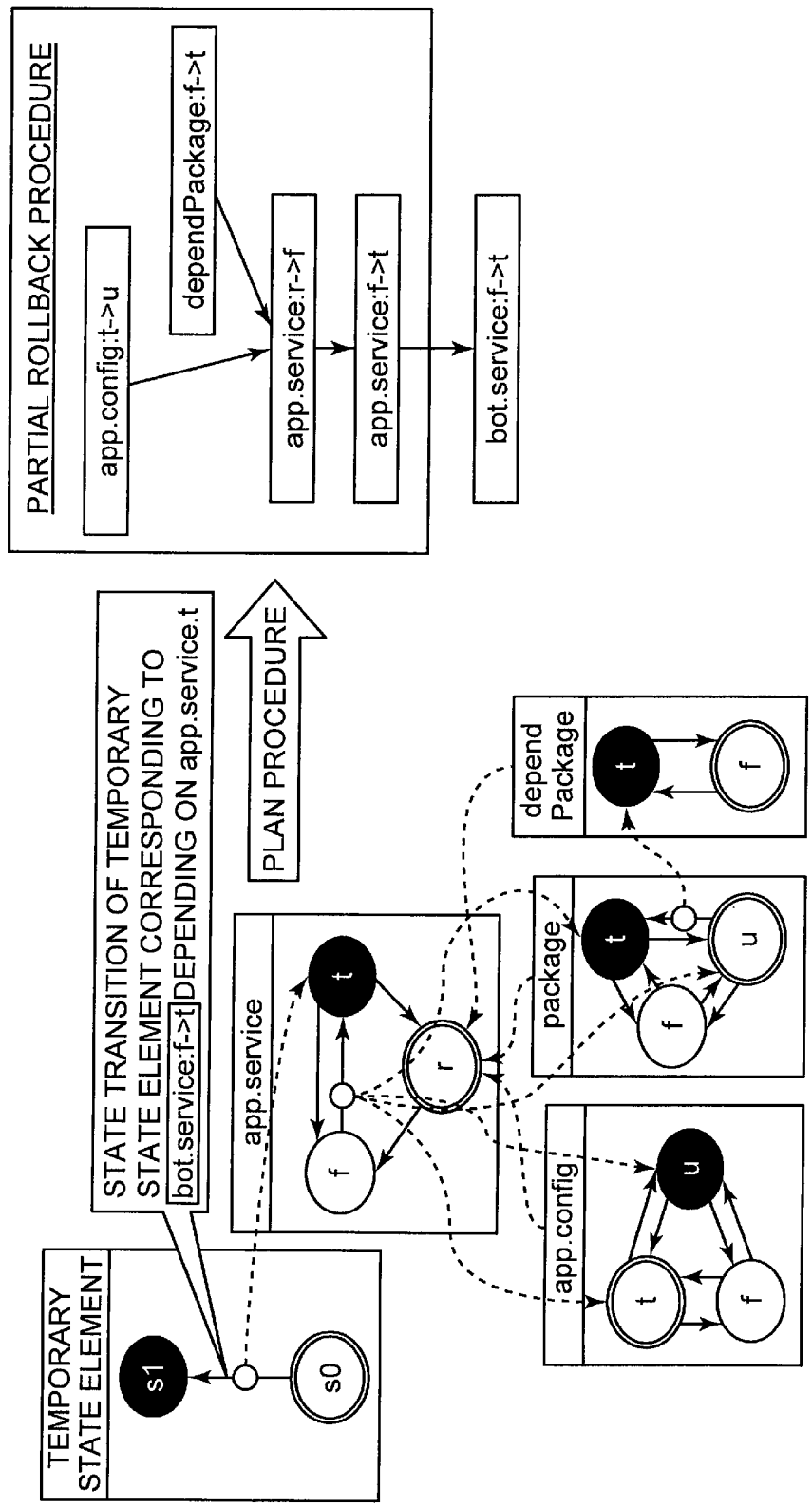
FIG. 18 is an explanatory diagram showing another example of the partial rollback procedure planning process by the reverse execution procedure planning unit 122.

In addition, when obtaining the partial rollback procedure and when there is a peripheral task depending on the planning target partial rollback procedure, the reverse execution procedure planning unit 122 adds a temporary state element. FIG. 18 is an explanatory diagram showing another example of the partial rollback procedure planning process by the reverse execution procedure planning unit 122.

The temporary state element shown in the left of FIG. 18 includes state transition corresponding to the task "bot.service:f->t" depending on the state app.service.t. In the state model shown in the left of FIG. 18, the dependency from the state transition of the temporary state element corresponding to the state transition "bot.service:f->t" to the state app.service.t is also added.

The right of FIG. 18 shows a partial rollback procedure planned by the reverse execution procedure planning unit 122 on the basis of the state model shown in the left of FIG. 18. By adding the temporary state element and the dependency, the partial rollback procedure shown in the right of FIG. 18 and the task "bot.service:f->t" are connected.

That is, by executing the additional process shown in FIG. 18, the reverse execution procedure planning unit 122 can connect the planned partial rollback procedure and the task depending on the planning target partial rollback procedure without contradiction.

Figure 19:
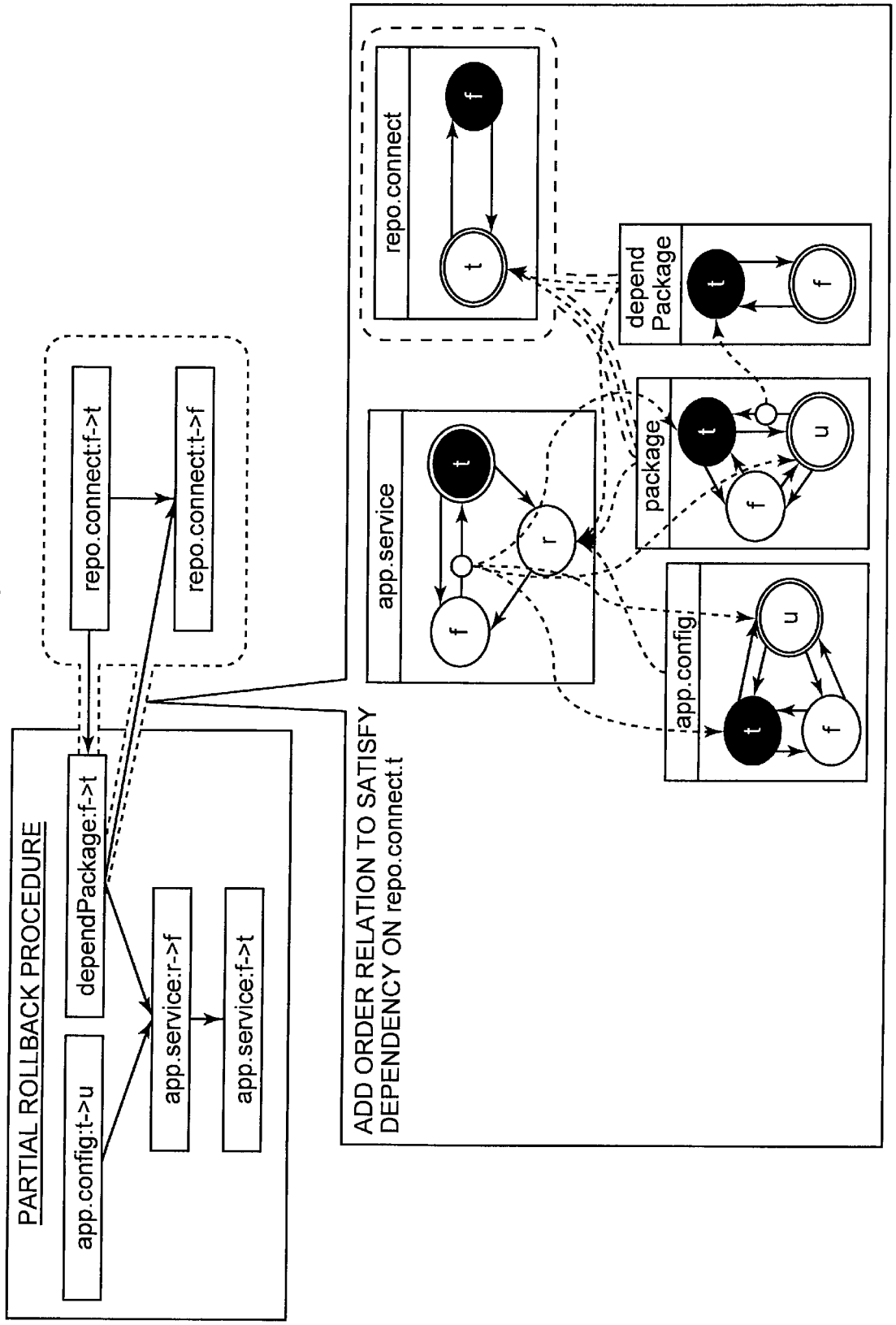
FIG. 19 is an explanatory diagram showing another example of the partial rollback procedure planning process by the reverse execution procedure planning unit 122.

If there is a dependency from the partial rollback procedure to a peripheral state element, the reverse execution procedure planning unit 122 adds an order relation between the partial rollback procedure and the peripheral reverse task. FIG. 19 is an explanatory diagram showing another example of the partial rollback procedure planning process by the reverse execution procedure planning unit 122.

Referring to the state element models in the balloon shown in FIG. 19, dependencies are given to the state repo.connect.t from the planning target partial rollback procedure. The reverse execution procedure planning unit 122 adds an order relation between the partial rollback procedure and the task so as to satisfy the dependencies on the state repo.connect.t.

In order to add the order relation, the reverse execution procedure planning unit 122 generates order relation candidates and solves constraints on the generated candidates, similarly to, for example, the execution order complementation process by the execution order adjustment unit 112. In the example shown in FIG. 19, the reverse execution procedure planning unit 122 obtains "a minimum order structure that satisfies all the given dependencies".

The reverse execution procedure planning unit 122 adds the order relation from the task "repo.connect:f->t" to the task "dependPackage:f->t", on the basis of the obtained minimum order structure. The reverse execution procedure planning unit 122 further adds the order relation from the task "dependPackage:f->t" to the task "repo.connect:t->f".

That is, by executing the additional processing shown in FIG. 19, the reverse execution procedure planning unit 122 can connect the planned partial rollback procedure and the task on which the planning target partial rollback procedure depends, without contradiction.

Figure 20:
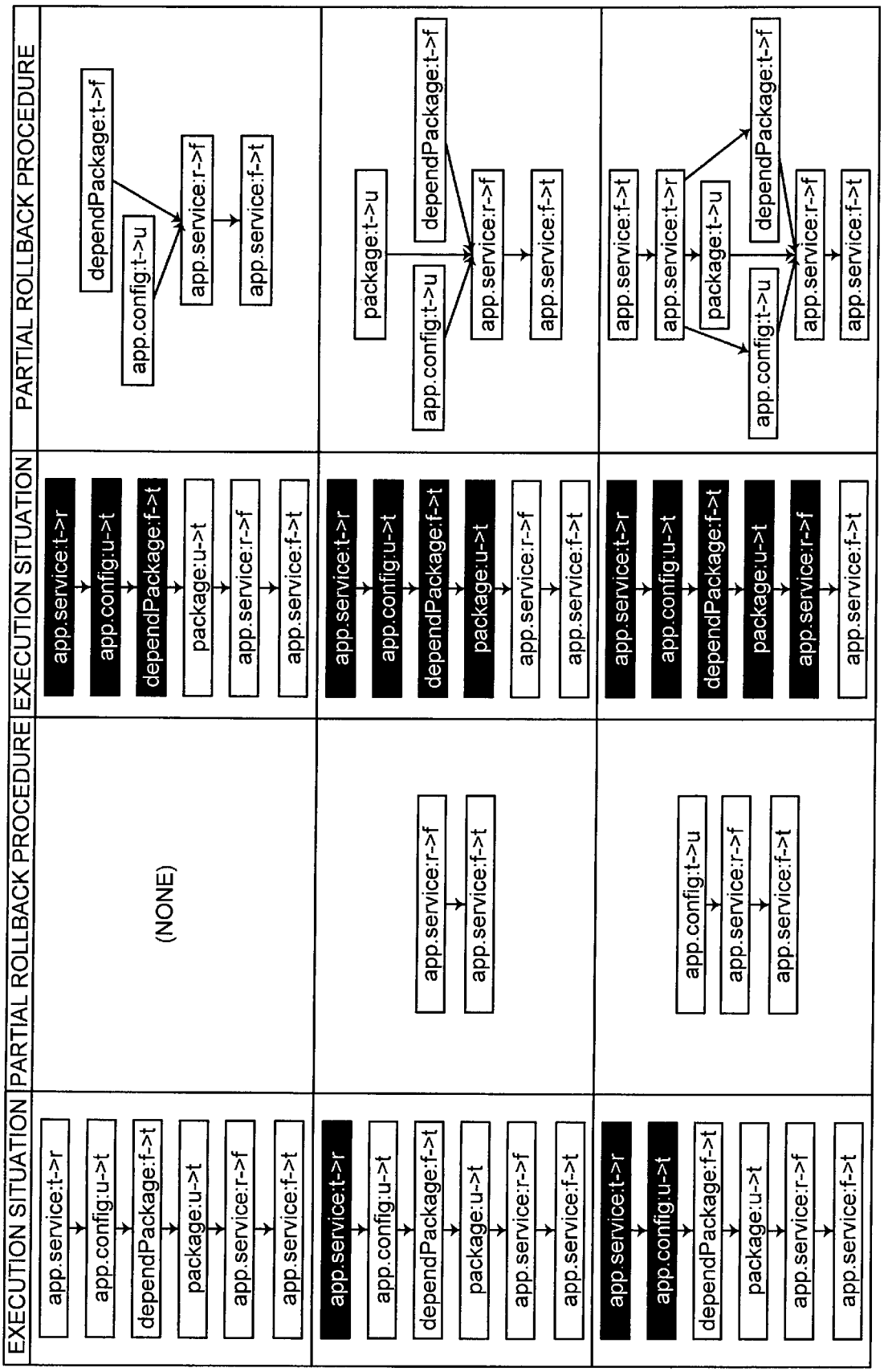
FIG. 20 is an explanatory diagram showing an example of a partial rollback procedure reference table D generated by the reverse execution procedure planning unit 122.

Then, the reverse execution procedure planning unit 122 generates a partial rollback procedure reference table D that is a table that returns the partial rollback procedure $P_i$ using the execution situation $s_i$ as a key. FIG. 20 is an explanatory diagram showing an example of the partial rollback procedure reference table D generated by the reverse execution procedure planning unit 122.

The reverse execution procedure planning unit 122 inputs, to the partial rollback procedure storage unit 123, the partial rollback procedure reference table D including the partial rollback procedure corresponding to each execution situation when an exception occurs, and a means (not shown) capable of solving the dependencies with the peripheries shown in FIGS. 18 to 19.

The reverse execution procedure planning unit 122 also inputs the generated reverse execution procedure to the partial rollback procedure storage unit 123. The partial rollback procedure storage unit 123 stores the input partial rollback procedure reference table D and reverse execution procedure.

[Description of Operation]

Figure 21:
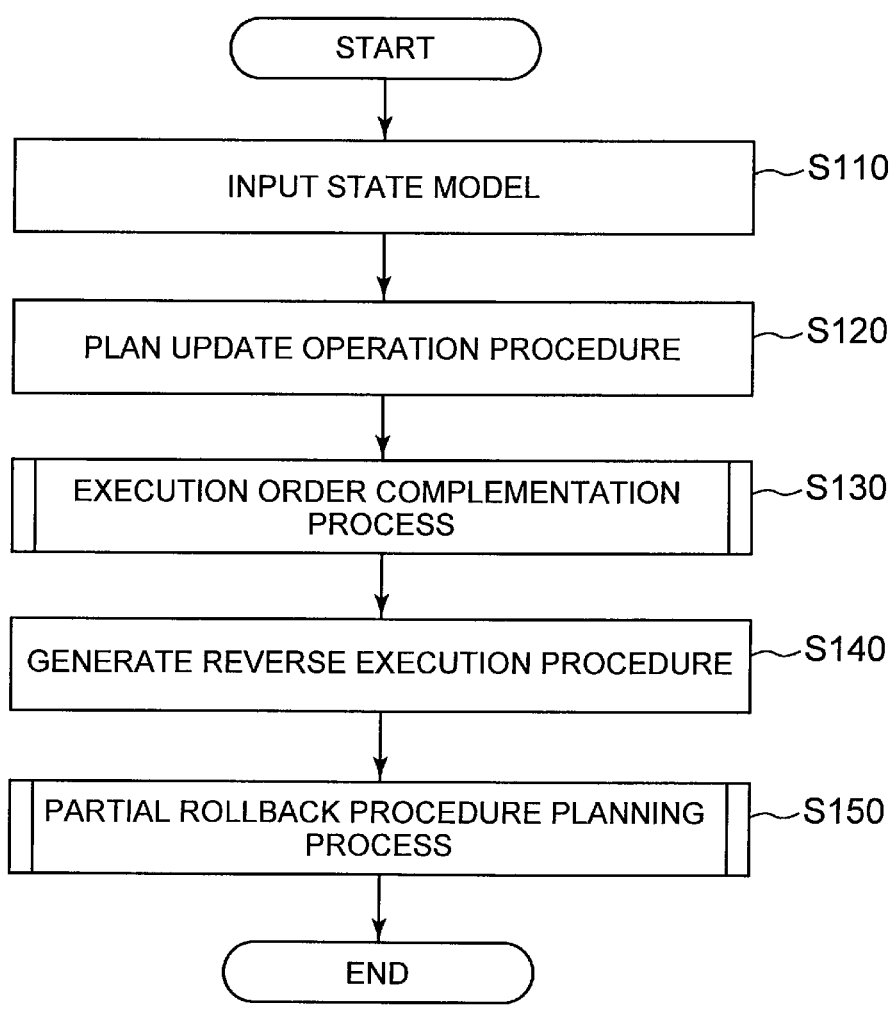
FIG. 21 is a flowchart showing an operation in a procedure generation process by the system update device 100 in the first exemplary embodiment.

In the following, the operation of the system update device 100 in the present exemplary embodiment for generating a procedure will be described with reference to FIG. 21. FIG. 21 is a flowchart showing an operation in a procedure generation process by the system update device 100 in the first exemplary embodiment.

First, state element models are input to the procedure planning unit 111 (step S110). The procedure planning unit 111 plans an update operation procedure on the basis of the input state element models (step S120). The procedure planning unit 111 inputs the planned update operation procedure to the execution order adjustment unit 112.

Then, the execution order adjustment unit 112 performs an execution order complementation process on the basis of the input update operation procedure (step S130). The execution order adjustment unit 112 inputs the update operation procedure in which the execution order is complemented to the rollback procedure comprehension unit 121.

Then, the rollback procedure comprehension unit 121 inputs only the reversely-executable part of the input update operation procedure to the reverse execution procedure planning unit 122. The reverse execution procedure planning unit 122 generates a reverse execution procedure on the basis of the input part (step S140).

Then, the rollback procedure comprehension unit 121 inputs the reversely-un-executable part of the input update operation procedure to the reverse execution procedure planning unit 122. The reverse execution procedure planning unit 122 performs a partial rollback procedure planning process on the basis of the input part (step S150). After executing the partial rollback procedure planning process, the system update device 100 terminates the procedure generation process.

Figure 22:
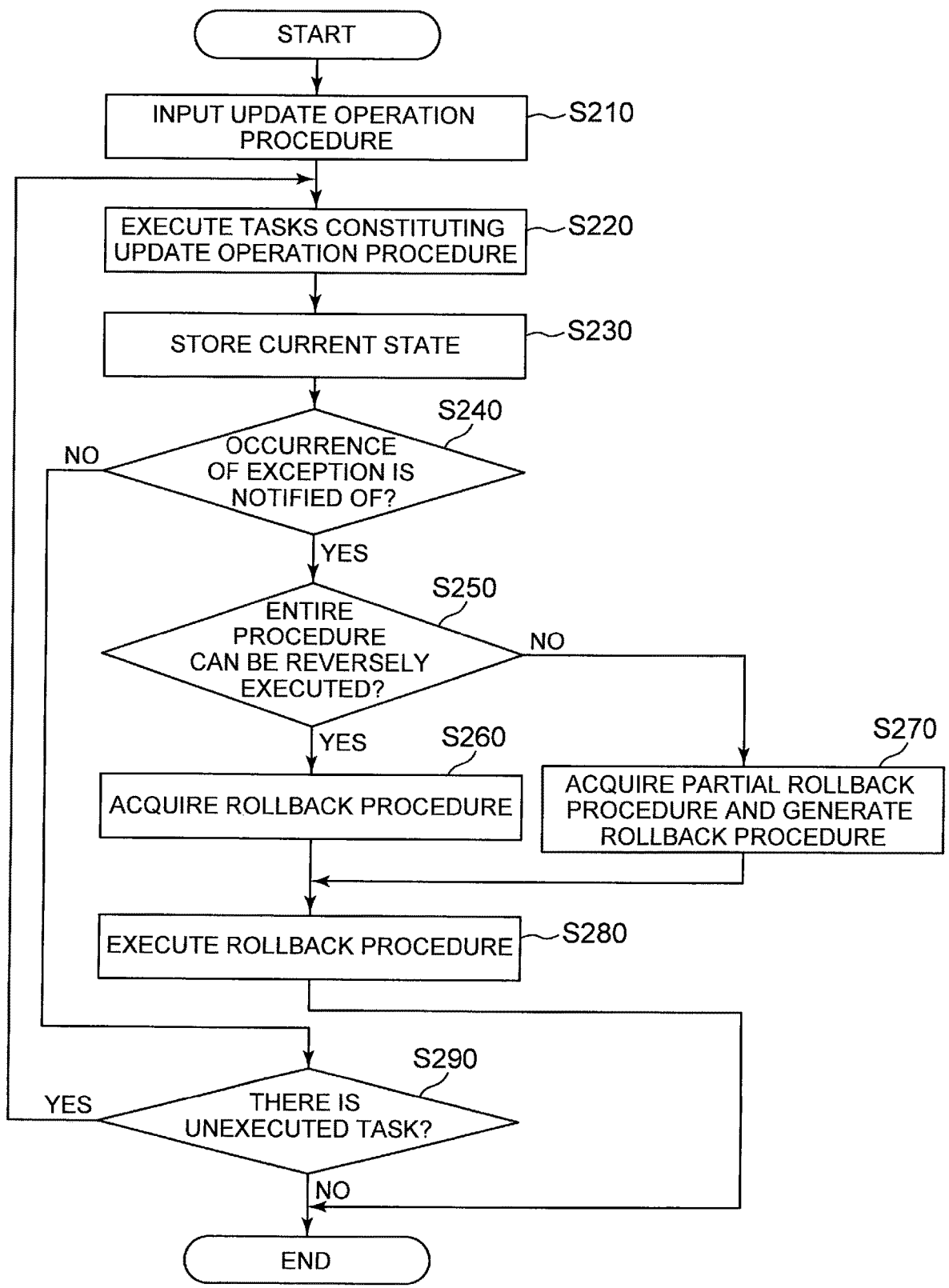
FIG. 22 is a flowchart showing an operation in a procedure execution process by the system update device 100 in the first exemplary embodiment.

Next, the operation of the system update device 100 in the present exemplary embodiment for executing the procedure will be described with reference to FIG. 22. FIG. 22 is a flowchart showing the operation in a procedure execution process by the system update device 100 in the first exemplary embodiment.

First, the update operation procedure in which the execution order is complemented by the execution order adjustment unit 112 is input to the procedure execution unit 113 (step S210).

Then, the procedure execution unit 113 executes the tasks constituting the input update operation procedure (step S220). After executing the task, the procedure execution unit 113 stores the current state of the system being updated 500 in the state management unit 132 (step S230).

Then, the procedure execution unit 113 confirms whether it has been notified that an exception has occurred in the system being updated 500 (step S240). When it has not been notified that an exception has occurred (No in step S240), the procedure execution unit 113 performs the process of step S290.

When it has been notified that an exception has occurred (Yes in step S240), the procedure execution unit 113 confirms whether the entire executed update operation procedure can be reversely executed (step S250).

When reverse execution can be executed for the entire update operation procedure (Yes in step S250), the procedure execution unit 113 instructs the rollback procedure generation unit 131 to generate a rollback procedure by reverse execution on the basis of the update operation procedure.

Then, the rollback procedure generation unit 131 acquires the reverse execution procedure according to the current state from the partial rollback procedure storage unit 123 as the rollback procedure (step S260). Then, the procedure execution unit 113 acquires the acquired rollback procedure from the rollback procedure generation unit 131. After acquiring the rollback procedure, the procedure execution unit 113 performs the process of step S280.

When reverse execution cannot be executed for a part of the update operation procedure (No in step S250), the procedure execution unit 113 inputs the update operation procedure being executed to the rollback procedure generation unit 131.

The rollback procedure generation unit 131 acquires the partial rollback procedure corresponding to the reversely-un-executable partial procedure of the input procedure from the partial rollback procedure storage unit 123 using the current state stored in the state management unit 132. The rollback procedure generation unit 131 also acquires the reverse execution procedure corresponding to the acquired partial rollback procedure.

Then, the rollback procedure generation unit 131 generates a rollback procedure by combining the reverse execution procedure generated by reversely executing the reversely-executable partial procedure and the acquired partial rollback procedure (step S270). The rollback procedure generation unit 131 inputs the generated rollback procedure to the procedure execution unit 113. After the procedure is input, the procedure execution unit 113 performs the process of step S280.

In step S280, the procedure execution unit 113 executes the input rollback procedure. By executing the rollback procedure, the state of the system being updated 500 returns to the initial state. After executing the rollback procedure, the system update device 100 terminates the procedure execution process.

In step S290, the procedure execution unit 113 confirms whether there is an unexecuted task among the tasks constituting the input update operation procedure. If there is an unexecuted task (Yes in step S290), the procedure execution unit 113 performs the process of step S220 again.

If all the tasks constituting the update operation procedure have been executed (No in step S290), the system update device 100 terminates the procedure execution process.

Figure 23:
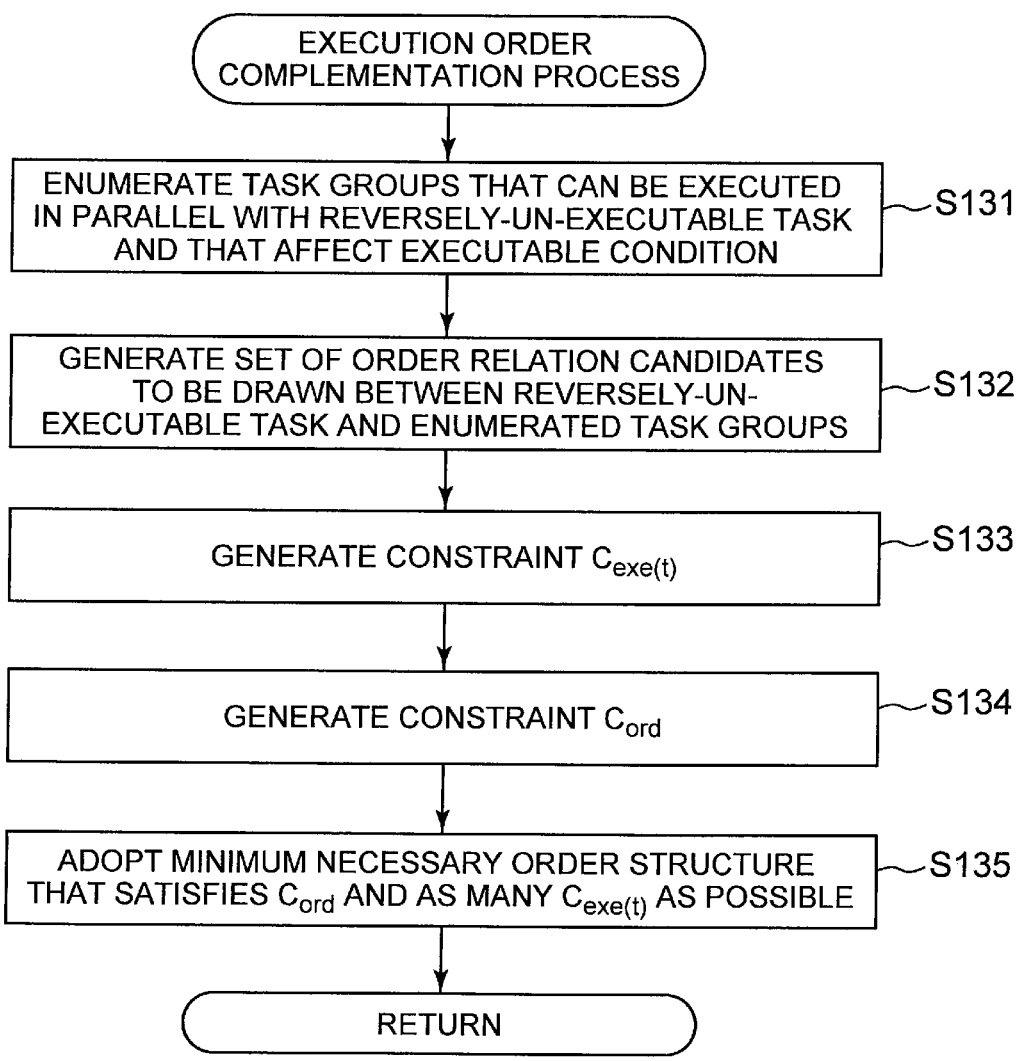
FIG. 23 is a flowchart showing an operation in an execution order complementation process by the execution order adjustment unit 112 in the first exemplary embodiment.

Next, the execution order complementation process of step S130, which is a sub process constituting the procedure generation process shown in FIG. 21, will be described with reference to FIG. 23. FIG. 23 is a flowchart showing the operation in the execution order complementation process by the execution order adjustment unit 112 in the first exemplary embodiment.

First, the execution order adjustment unit 112 enumerates task groups that can be executed in parallel with the reversely-un-executable task t and that affect the executable condition of the reversely-un-executable task t (step S131).

Then, the execution order adjustment unit 112 generates a set of order relation candidates to be drawn between the reversely-un-executable task t and the enumerated task groups (step S132).

Then, the execution order adjustment unit 112 generates a constraint $C_{exe(t)}$ for all the tasks t to be "task t is executable" (step S133).

Then, the execution order adjustment unit 112 generates a constraint $C_{ord}$ for the order relation of the reverse execution procedure to be consistent (step S134).

Then, the execution order adjustment unit 112 adopts, as the reverse execution procedure, the procedure having the minimum necessary order structure that satisfies $C_{ord}$ and as many $C_{exe(t)}$ as possible (step S135). After the adoption, the execution order adjustment unit 112 terminates the execution order complementation process.

Figure 24:
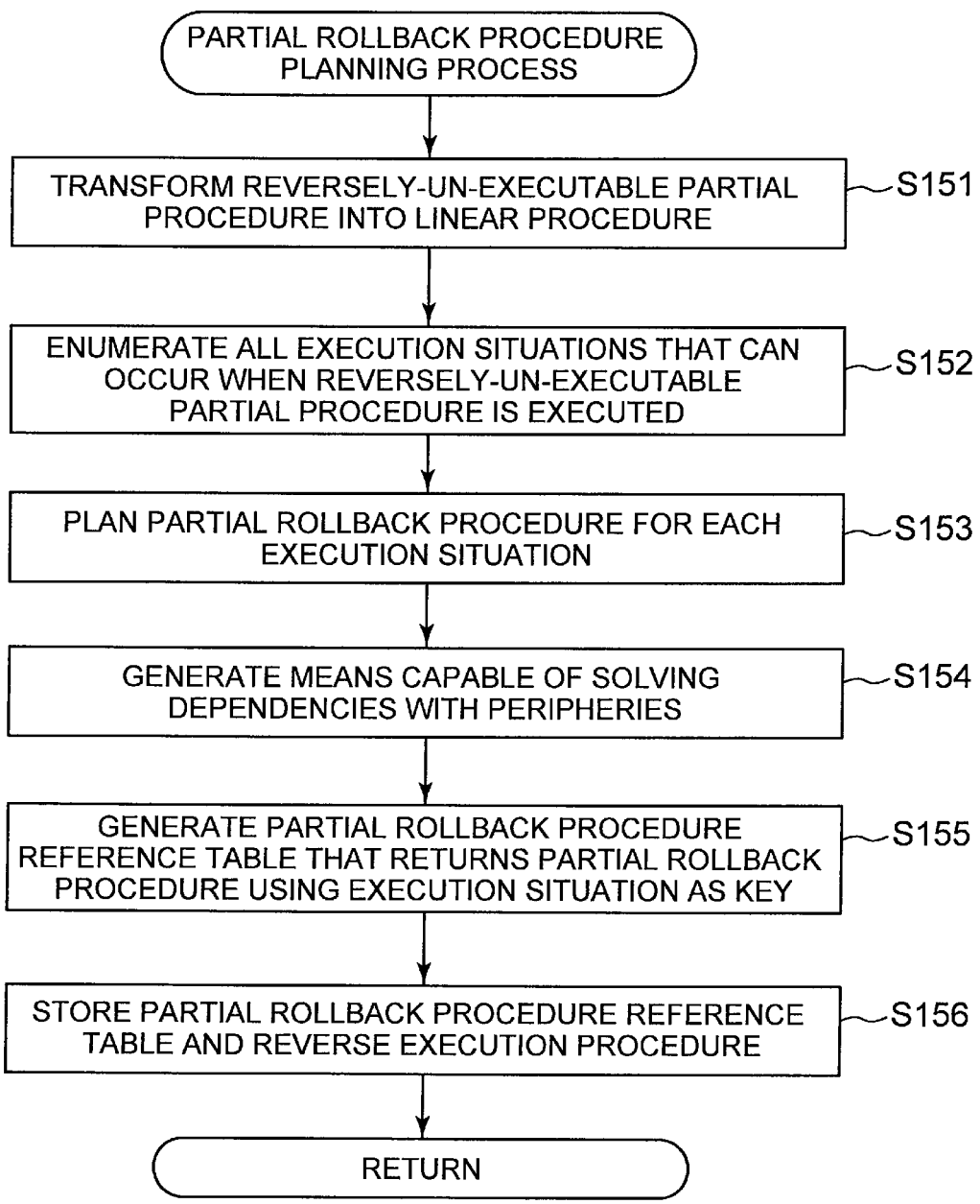
FIG. 24 is a flowchart showing an operation in a partial rollback procedure planning process by the reverse execution procedure planning unit 122 in the first exemplary embodiment.

Next, the partial rollback procedure planning process of step S150, which is a sub process constituting the procedure generation process shown in FIG. 21, will be described with reference to FIG. 24. FIG. 24 is a flowchart showing the operation in the partial rollback procedure planning process by the reverse execution procedure planning unit 122 in the first exemplary embodiment.

First, the reverse execution procedure planning unit 122 transforms the reversely-un-executable partial procedure P into a linear procedure by adding an appropriate order relation (step S151). The process of step S151 may be omitted.

Then, the reverse execution procedure planning unit 122 enumerates all the execution situations S that can occur when the reversely-un-executable partial procedure P is executed (step S152).

Then, the reverse execution procedure planning unit 122 plans, for each execution situation a partial rollback procedure $P_i$ for transitioning the state of the state model to the state before the partial procedure P is executed (step S153).

Then, the reverse execution procedure planning unit 122 generates a means capable of solving the dependencies of the planned partial rollback procedure $P_i$ with the peripheries (step S154).

Then, the reverse execution procedure planning unit 122 generates a partial rollback procedure reference table D that is a table that returns the partial rollback procedure $P_i$ using the execution situation $s_i$ as a key (step S155). The partial rollback procedure reference table D includes the partial rollback procedure $P_i$ corresponding to each execution situation $s_i$ when an exception occurs, and a means capable of solving the dependency of the partial rollback procedure $P_i$ with the peripheries.

Then, the reverse execution procedure planning unit 122 inputs the partial rollback procedure reference table D and the reverse execution procedure to the partial rollback procedure storage unit 123. The partial rollback procedure storage unit 123 stores the partial rollback procedure reference table D and the reverse execution procedure (step S156). After the storing, the reverse execution procedure planning unit 122 terminates the partial rollback procedure planning process.

Description of Effects

The execution order adjustment unit 112 of the system update device 100 in the present exemplary embodiment complements the execution order for the reverse execution procedure generated by reversely executing the update operation procedure. By complementing the execution order, the generated reverse execution procedure can be used as a rollback procedure. That is, since the rollback procedure is generated by a simple reverse execution process, the system update device 100 can reduce the resource amount required for preparing rollback procedures.

In addition, the rollback procedure generation unit 131 of the system update device 100 in the present exemplary embodiment combines the reverse execution procedure generated by reversely executing the reversely-executable part of the update operation procedure and the partial rollback procedure generated in the planning process for the reversely-un-executable part of the update operation procedure. By combining, the rollback procedure generation unit 131 generates a usable rollback procedure. That is, since the target part of the planning process is reduced, the system update device 100 can reduce the resource amount required for preparing rollback procedures.

Second Exemplary Embodiment

[Description of Configuration]

Figure 25:
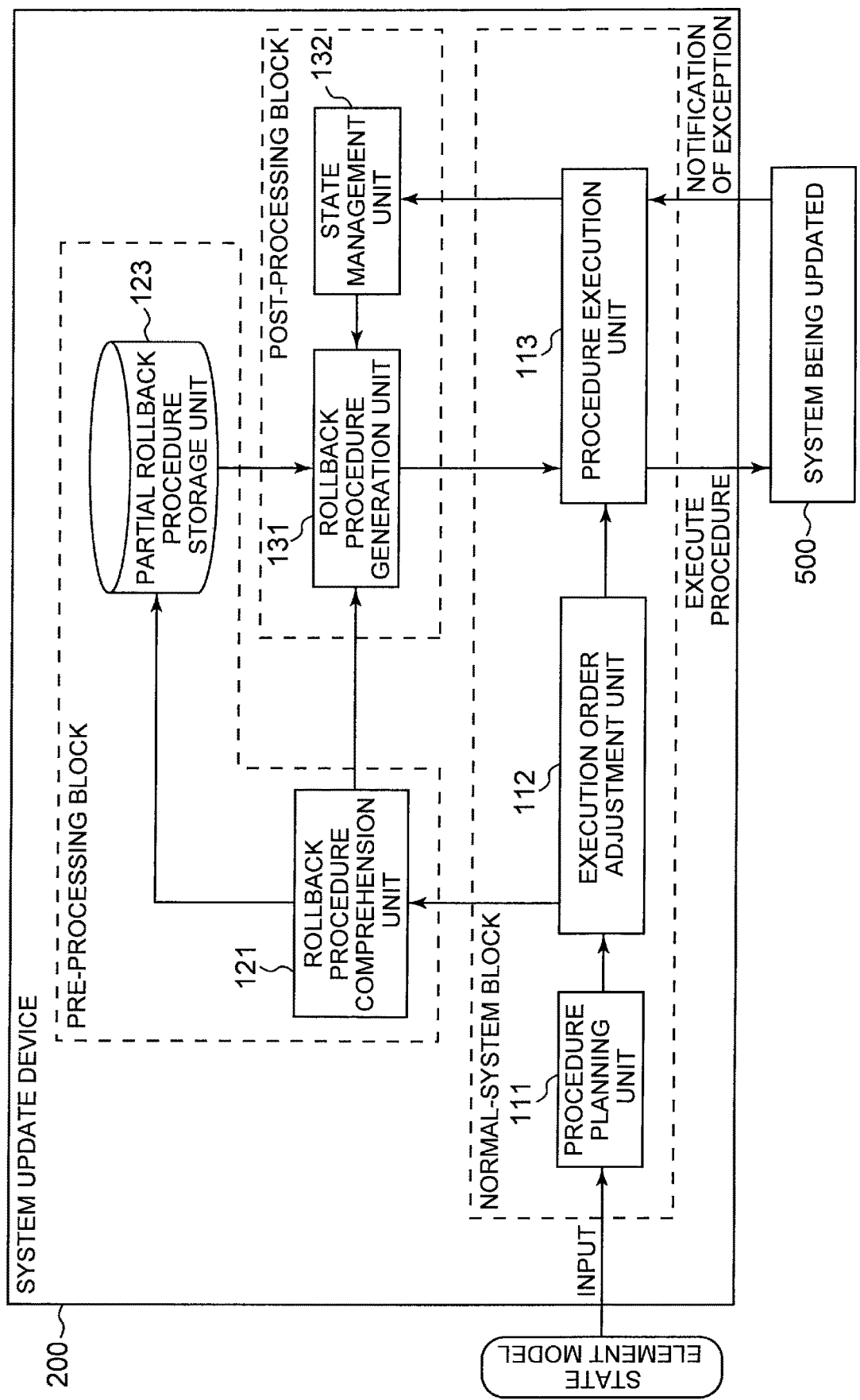
FIG. 25 is an explanatory diagram showing a configuration example of a system update device in a second exemplary embodiment of the present invention.

Next, a second exemplary embodiment of the present invention will be described with reference to the drawings. FIG. 25 is an explanatory diagram showing a configuration example of a system update device in the second exemplary embodiment of the present invention. As shown in FIG. 25, a system update device 200 in the present exemplary embodiment includes a normal-system block, a pre-processing block, and a post-processing block.

The normal-system block and the post-processing block shown in FIG. 25 are the same as the normal-system block and the post-processing block shown in FIG. 2, respectively. Unlike the pre-processing block shown in FIG. 2, the pre-processing block shown in FIG. 25 includes a rollback procedure comprehension unit 121 and a partial rollback procedure storage unit 123.

That is, the system update device 200 in the present exemplary embodiment executes the execution order complementation process in the first exemplary embodiment without executing the partial rollback procedure planning process in the first exemplary embodiment. The pre-processing block of the system update device 200 targets an update operation procedure not including a reversely-un-executable partial procedure. In the present exemplary embodiment, the rollback procedure comprehension unit 121 generates a reverse execution procedure.

[Description of Operation]

Figure 26:
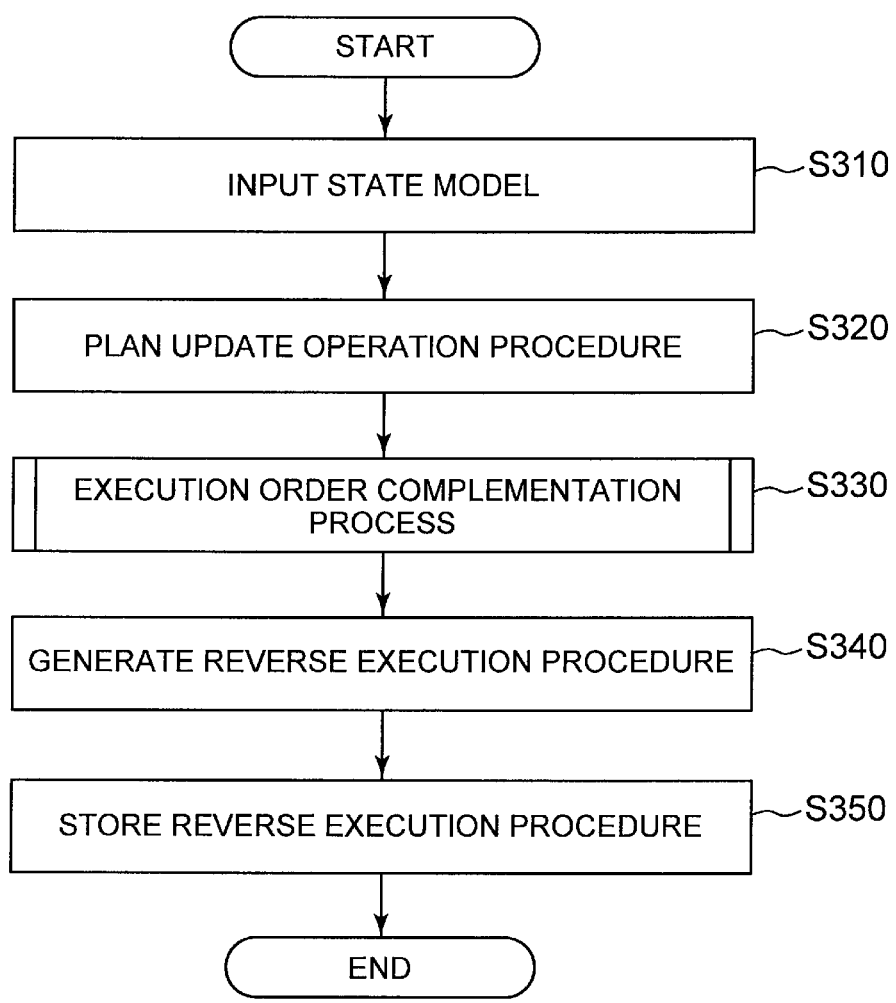
FIG. 26 is a flowchart showing an operation in a procedure generation process by a system update device 200 in the second exemplary embodiment.

In the following, the operation of the system update device 200 in the present exemplary embodiment for generating a procedure will be described with reference to FIG. 26. FIG. 26 is a flowchart showing an operation in a procedure generation process by the system update device 200 in the second exemplary embodiment.

The processes of step S310 to step S330 shown in FIG. 26 are the same as the processes of step S110 to step S130 shown in FIG. 21, respectively.

Then, the rollback procedure comprehension unit 121 generates a reverse execution procedure on the basis of the input update operation procedure (step S340). The rollback procedure comprehension unit 121 inputs the generated reverse execution procedure to the partial rollback procedure storage unit 123.

Then, the partial rollback procedure storage unit 123 stores the input reverse execution procedure (step S350). After the storing, the system update device 200 terminates the procedure generation process.

Figure 27:
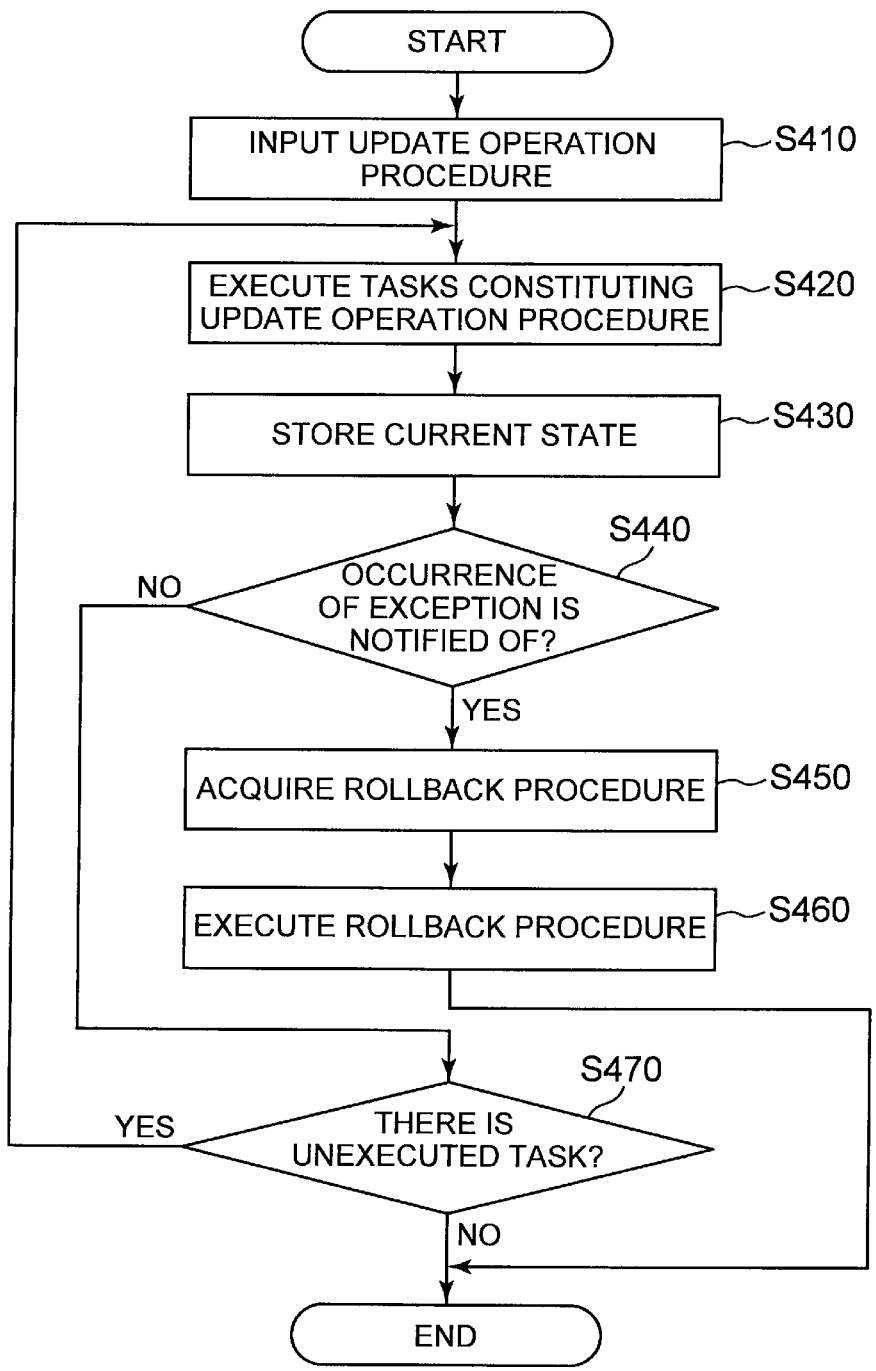
FIG. 27 is a flowchart showing an operation in a procedure execution process by the system update device 200 in the second exemplary embodiment.

Next, the operation of the system update device 200 in the present exemplary embodiment for executing the procedure will be described with reference to FIG. 27. FIG. 27 is a flowchart showing the operation in a procedure execution process by the system update device 200 in the second exemplary embodiment.

The processes of step S410 to step S440 shown in FIG. 27 are the same as the processes of step S210 to step S240 shown in FIG. 22, respectively. In addition, the processes of step S450 to step S470 shown in FIG. 27 are the same as the processes of step S260 and step S280 to step S290 shown in FIG. 22, respectively.

[Description of Effects]

The execution order adjustment unit 112 of the system update device 200 in the present exemplary embodiment complements the execution order for the reverse execution procedure generated by reversely executing the update operation procedure. By complementing the execution order, the generated reverse execution procedure can be used as a rollback procedure.

That is, since the rollback procedure is generated by a simple reverse execution process, the system update device 200 can reduce the resource amount required for preparing rollback procedures.

Third Exemplary Embodiment

[Description of Configuration]

Figure 28:
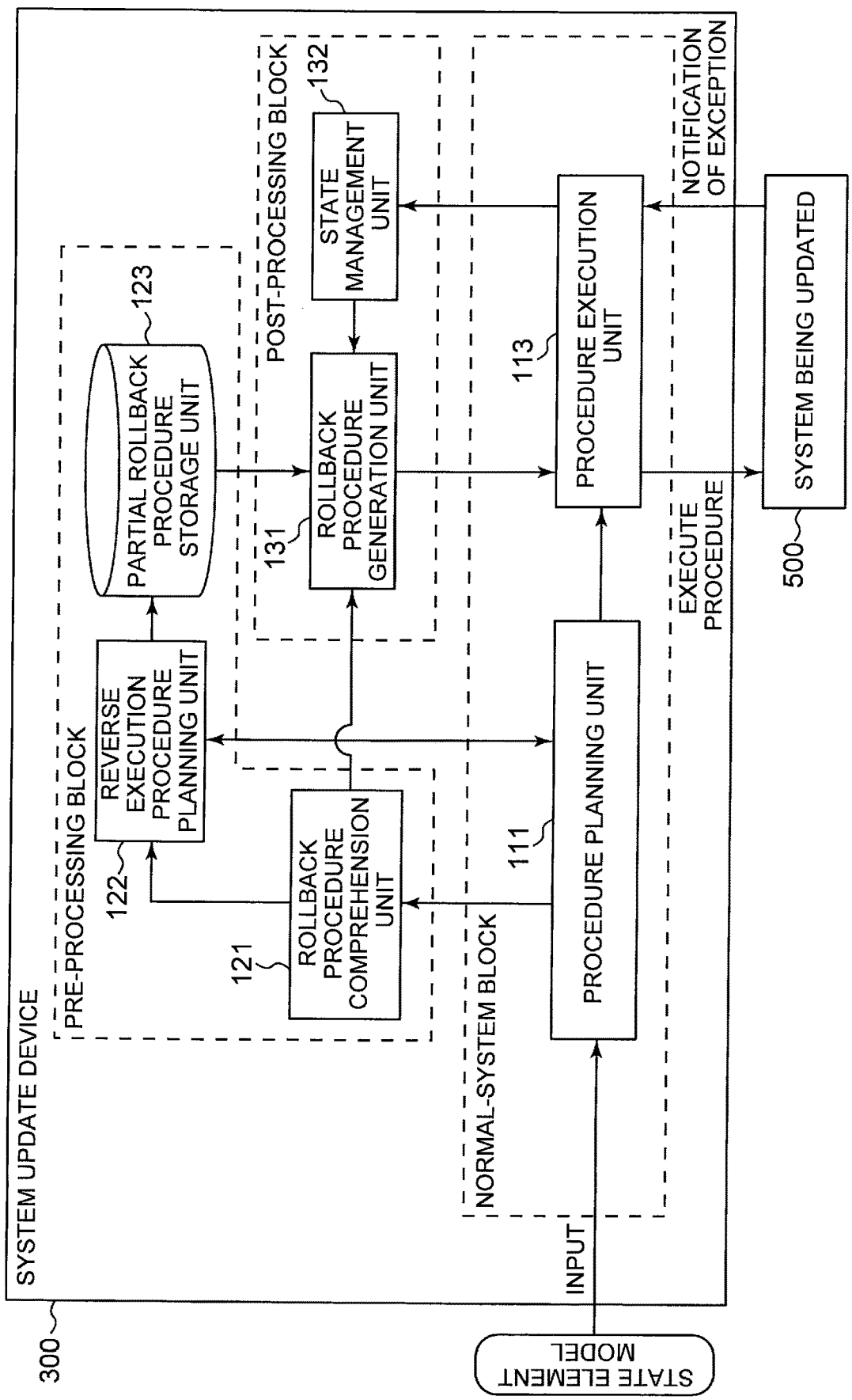
FIG. 28 is an explanatory diagram showing a configuration example of a system update device in a third exemplary embodiment of the present invention.

Next, a third exemplary embodiment of the present invention will be described with reference to the drawings. FIG. 28 is an explanatory diagram showing a configuration example of a system update device in the third exemplary embodiment of the present invention. As shown in FIG. 28, a system update device 300 in the present exemplary embodiment includes a normal-system block, a pre-processing block, and a post-processing block.

The pre-processing block and the post-processing block shown in FIG. 28 are the same as the pre-processing block and the post-processing block shown in FIG. 2, respectively. Unlike the normal-system block shown in FIG. 2, the normal-system block shown in FIG. 28 includes a procedure planning unit 111 and a procedure execution unit 113.

That is, the system update device 300 in the present exemplary embodiment executes the partial rollback procedure planning process in the first exemplary embodiment without executing the execution order complementation process in the first exemplary embodiment. The pre-processing block of the system update device 300 targets an update operation procedure that does not require execution order complementation in the generated reverse execution procedure.

[Description of Operation]

Figure 29:
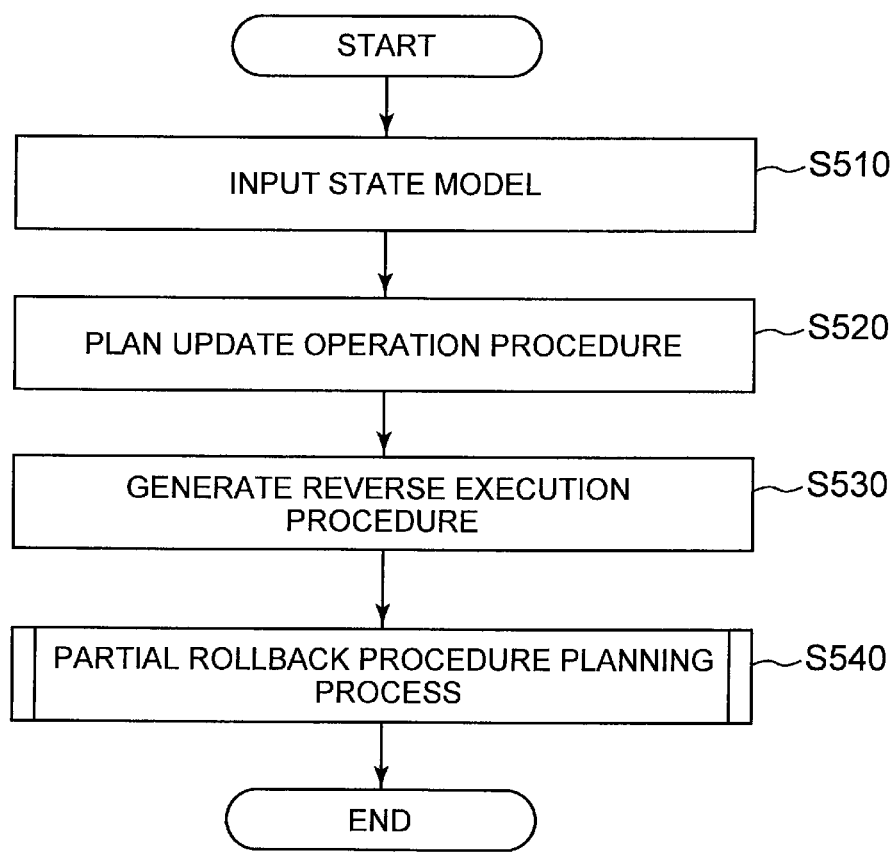
FIG. 29 is a flowchart showing an operation in a procedure generation process by a system update device 300 in the third exemplary embodiment.

In the following, the operation of the system update device 300 in the present exemplary embodiment for generating a procedure will be described with reference to FIG. 29. FIG. 29 is a flowchart showing an operation in a procedure generation process by the system update device 300 in the third exemplary embodiment.

The processes of step S510 to step S520 shown in FIG. 29 are the same as the processes of step S110 to step S120 shown in FIG. 21, respectively.

The procedure planning unit 111 inputs the planned update operation procedure to the rollback procedure comprehension unit 121. The rollback procedure comprehension unit 121 inputs only the reversely-executable part of the input update operation procedure to the reverse execution procedure planning unit 122. The reverse execution procedure planning unit 122 generates a reverse execution procedure on the basis of the input part (step S530).

Then, the rollback procedure comprehension unit 121 inputs the reversely-un-executable part of the input update operation procedure to the reverse execution procedure planning unit 122. The reverse execution procedure planning unit 122 performs a partial rollback procedure planning process on the basis of the input part (step S540). After executing the partial rollback procedure planning process, the system update device 300 terminates the procedure generation process.

In addition, the process by the system update device 300 in the present exemplary embodiment for executing the procedure is the same as the procedure execution process shown in FIG. 22.

Description of Effects

The rollback procedure generation unit 131 of the system update device 300 in the present exemplary embodiment combines the reverse execution procedure generated by reversely executing the reversely-executable part of the update operation procedure and the partial rollback procedure generated in the planning process for the reversely-un-executable part of the update operation procedure. By combining, the rollback procedure generation unit 131 generates a usable rollback procedure. That is, since the target part of the planning process is reduced, the system update device 300 can reduce the resource amount required for preparing rollback procedures.

Figure 30:
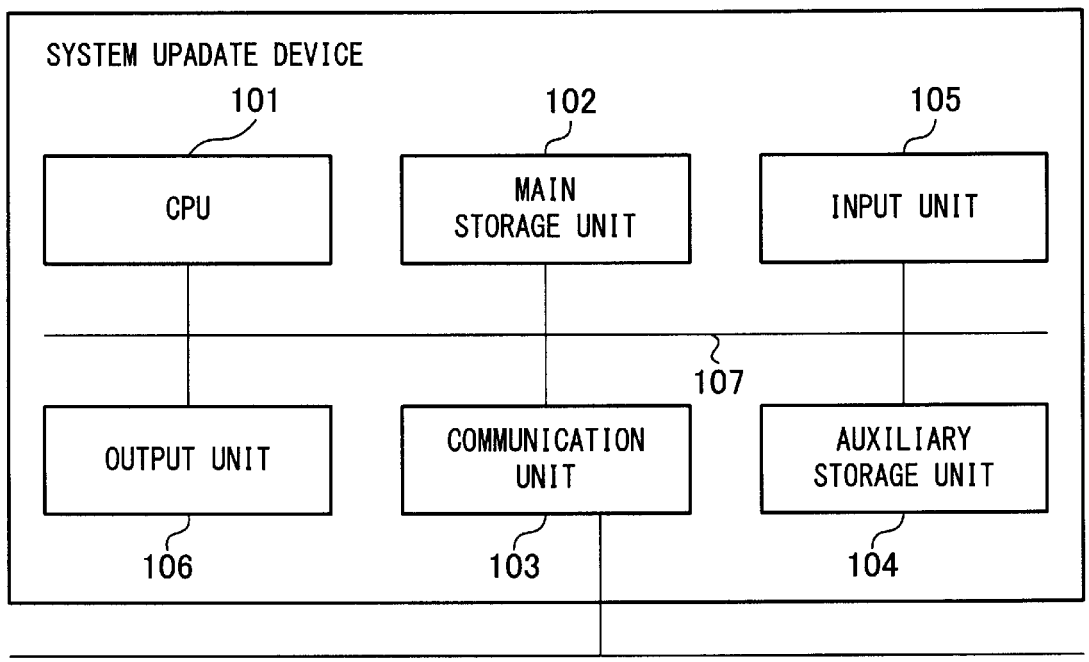
FIG. 30 is an explanatory diagram showing a hardware configuration example of a system update device to which each exemplary embodiment of the present invention is applicable.

In the following, a specific example of the hardware configuration of each of the system update device 100, the system update device 200, and the system update device 300 in the respective exemplary embodiments will be described. FIG. 30 is an explanatory diagram showing a hardware configuration example of a system update device to which each exemplary embodiment of the present invention is applicable.

The system update device shown in FIG. 30 includes a central processing unit (CPU) 101, a main storage unit 102, a communication unit 103, and an auxiliary storage unit 104. The system update device may further include an input unit 105 for the user to operate and an output unit 106 for presenting a processing result or the progress of the processing content to the user.

The system update device 100, the system update device 200, and the system update device 300 are implemented by software by the CPU 101 shown in FIG. 30 executing programs that provide the functions of the constituent elements.

That is, the CPU 101 loads the programs stored in the auxiliary storage unit 104 in the main storage unit 102 and executes the programs to control the operation of each of the system update device 100, the system update device 200, and the system update device 300, whereby the functions are implemented by software.

The main storage unit 102 is used as a work region of data and a temporary save region of data. The main storage unit 102 is, for example, a random access memory (RAM).

The communication unit 103 has a function of inputting and outputting data to and from peripheral devices via a wired network or a wireless network (information communication network).

The auxiliary storage unit 104 is a non-transitory tangible storage medium. The non-transitory tangible storage medium is, for example, a magnetic disk, a magneto-optical disk, a compact disk read only memory (CD-ROM), a digital versatile disk read only memory (DVD-ROM), or a semiconductor memory.

The input unit 105 has a function of inputting data and processing instructions. The input unit 105 is an input device, such as a keyboard or a mouse.

The output unit 106 has a function of outputting data. The output unit 106 is, for example, a display device, such as a liquid crystal display device, or a printing device, such as a printer.

In addition, as shown in FIG. 30, the constituent elements of the system update device are connected to a system bus 107.

The auxiliary storage unit 104 stores programs for implementing, for example, the procedure planning unit 111, the execution order adjustment unit 112, the procedure execution unit 113, the rollback procedure comprehension unit 121, the reverse execution procedure planning unit 122, the rollback procedure generation unit 131, and the state management unit 132 shown in FIG. 2.

The main storage unit 102 is used as, for example, a storage region of the partial rollback procedure storage unit 123. In addition, the procedure planning unit 111 and the procedure execution unit 113 may execute a communication process via the communication unit 103.

The system update device 100, the system update device 200, and the system update device 300 may be implemented by hardware. For example, the system update device 100 may have a circuit including a hardware component, such as a large scale integration (LSI) or the like, for implementing the functions as shown in FIG. 2.

In addition, a part of or all of the constituent elements are implemented by a general purpose circuitry, a dedicated circuitry, a processor, or the like, or a combination thereof. These may be constituted by a single chip (for example, the LSI), or by a plurality of chips connected via a bus. A part of or all of the constituent elements may be implemented by a combination of the above circuitry or the like and a program.

In the case in which a part of or all of the constituent elements are implemented by a plurality of information process devices, circuitries, or the like, the information process devices, circuitries, or the like may be arranged in a concentrated manner, or dispersedly. For example, the information process devices, circuitries, or the like may be implemented as a form in which each is connected via a communication network, such as a client-and-server system or a cloud computing system.

Figure 31:
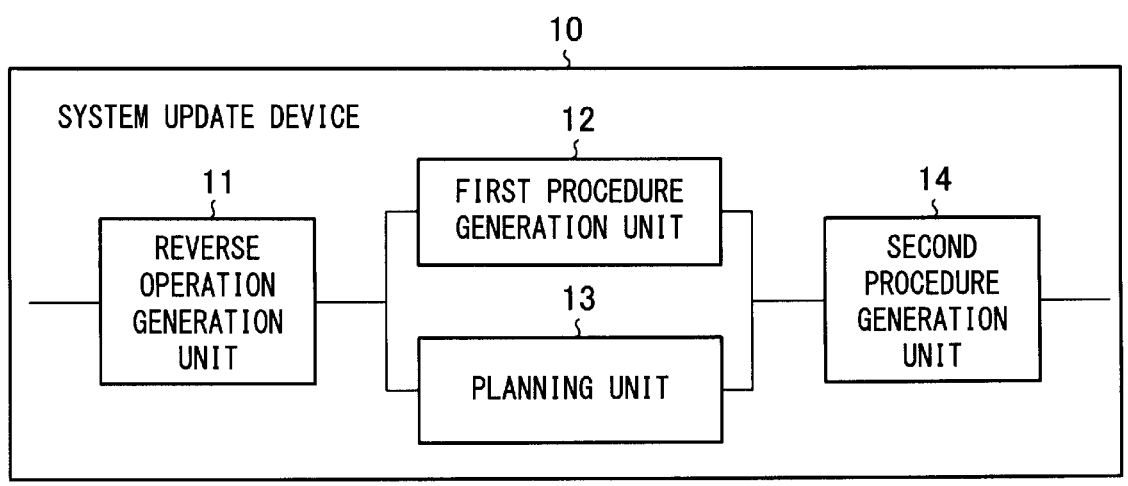
FIG. 31 is a block diagram showing an outline of the system update device according to the present invention.
Figure 32:
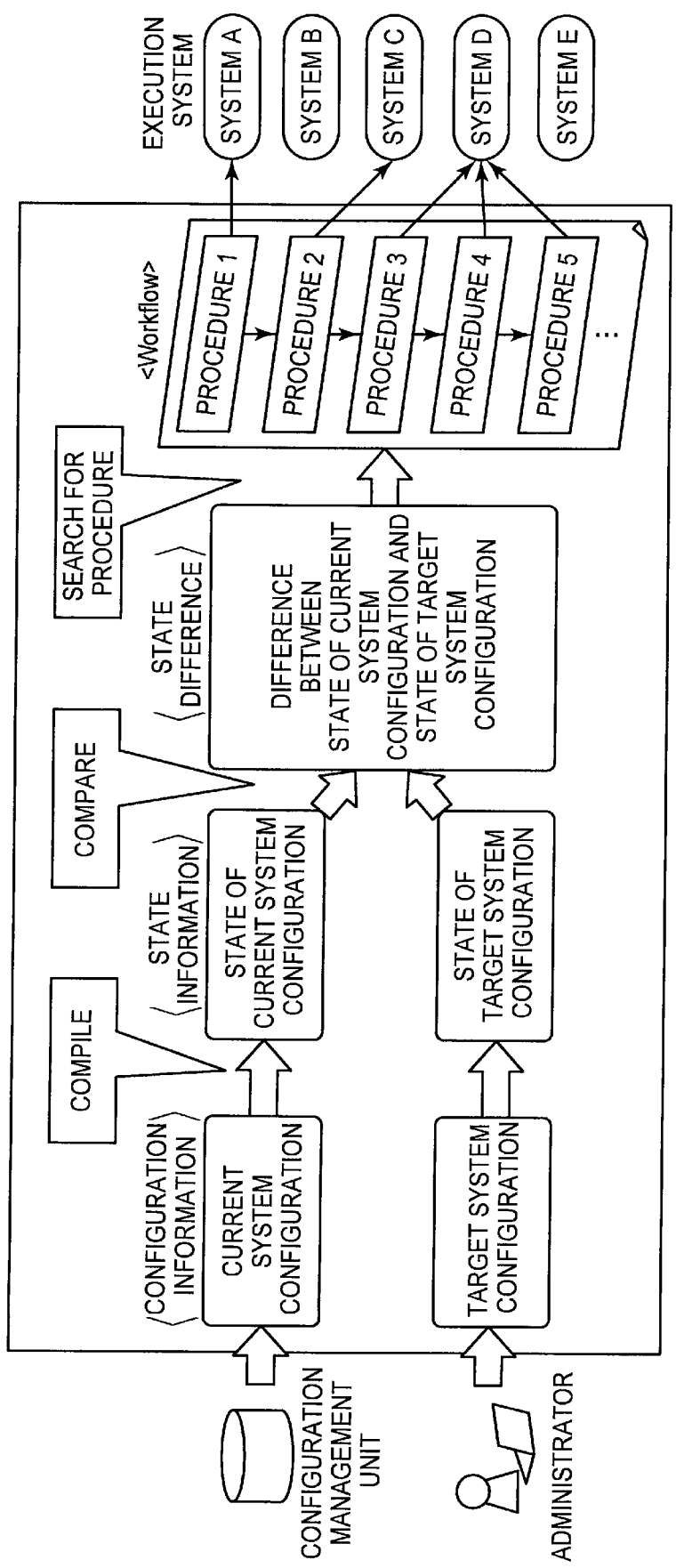
FIG. 32 is an explanatory diagram showing an example of an automatic procedure generation process by a general procedure generation device.

Next, an outline of the present invention will be described. FIG. 31 is a block diagram showing an outline of the system update device according to the present invention. The system update device 10 according to the present invention includes a reverse operation generation unit 11 (for example, the reverse execution procedure planning unit 122) that generates a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order, a first procedure generation unit 12 (for example, the reverse execution procedure planning unit 122) that generates a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order, a planning unit 13 (for example, the reverse execution procedure planning unit 122) that plans an operation procedure for transitioning, from an arbitrary state during execution of the update procedure to the current state, the state of a state element which corresponds to a part of the update procedure that includes operations for which a reverse operation cannot be generated, and a second procedure generation unit 14 (for example, the rollback procedure generation unit 131) that generates a rollback procedure by combining the generated reverse execution procedure and the planned procedure.

With such a configuration, the system update device can reduce the resource amount required to prepare rollback procedures.

The system update device 10 may include a management unit (for example, the state management unit 132) that manages a latest state of the system being update during execution of the update procedure, in which the second procedure generation unit 14 may generate the rollback procedure on the basis of the managed latest state.

With such a configuration, the system update device can generate a procedure of operations for rolling back the state of the system from the current state to the initial state.

The system update device 10 may further include a storage unit (for example, the partial rollback procedure storage unit 123) that stores the generated reverse execution procedure, the planned procedure, and the state of the system being update during execution of the update procedure in association with each other, in which the second procedure generation unit 14 may generate the rollback procedure using the generated reverse execution procedure associated with the managed latest state and the planned procedure associated with the latest state.

With such a configuration, the system update device can generate rollback procedures more quickly.

The storage unit may store information to be used for combining the generated reverse execution procedure and the planned procedure in association with the generated reverse execution procedure and the planned procedure.

With such a configuration, the system update device can combine the reverse execution procedure and the partial rollback procedure without contradiction.

The system update device 10 may include an execution unit (for example, the procedure execution unit 113) that executes a procedure.

With such a configuration, the system update device can execute the rollback procedure when an exception occurs.

The update procedure may be a procedure in which two or more operations are arranged in random order to be executable.

With such a configuration, the system update device can generate rollback procedures for all the states that the system being update can reach while the partially-ordered procedure is being executed.

The first procedure generation unit 12 may generate the update procedure on the basis of an initial state of the system being update and a target state of the system being update.

With such a configuration, the system update device can generate an update procedure.

The present invention has been described with reference to the exemplary embodiments and examples, but is not limited to the above exemplary embodiments and examples. Various changes that can be understood by those skilled in the art within the scope of the present invention can be made to the configurations and details of the present invention.

This application claims priority based on Japanese Patent Application No. 2018-063842 filed on Mar. 29, 2018, the disclosure of which is incorporated herein in its entirety.

In addition, a part or all of the above exemplary embodiments can also be described as follows, but are not limited to the following.

(Supplementary note 1) A system update device comprising:

a reverse operation generation unit configured to generate a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

a first procedure generation unit configured to generate a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

a planning unit configured to plan an operation procedure for transitioning, from an arbitrary state during execution of the update procedure to the current state, the state of a state element which corresponds to a part of the update procedure that includes operations for which a reverse operation cannot be generated; and a second procedure generation unit configured to generate a rollback procedure by combining the generated reverse execution procedure and the planned procedure.

(Supplementary note 2) The system update device according to Supplementary note 1, further comprising:

a management unit configured to manage a latest state of the system being update during execution of the update procedure, wherein the second procedure generation unit is configured to generate the rollback procedure on the basis of the managed latest state.

(Supplementary note 3) The system update device according to Supplementary note 2, further comprising:

a storage unit configured to store the generated reverse execution procedure, the planned procedure, and the state of the system being update during execution of the update procedure in association with each other, wherein the second procedure generation unit is configured to generate the rollback procedure using the generated reverse execution procedure associated with the managed latest state and the planned procedure associated with the latest state.

(Supplementary note 4) The system update device according to Supplementary note 3, wherein the storage unit is configured to store information to be used for combining the generated reverse execution procedure and the planned procedure in association with the generated reverse execution procedure and the planned procedure.

(Supplementary note 5) The system update device according to any one of Supplementary notes 1 to 4, further comprising an execution unit configured to execute a procedure.

(Supplementary note 6) The system update device according to any one of Supplementary notes 1 to 5, wherein the update procedure is a procedure in which two or more operations are arranged in random order to be executable.

(Supplementary note 7) The system update device according to any one of Supplementary notes 1 to 6, wherein the first procedure generation unit is configured to generate the update procedure on the basis of an initial state of the system being update and a target state of the system being update.

(Supplementary note 8) A system update method comprising:

generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

planning an operation procedure for transitioning, from an arbitrary state during execution of the update procedure to the current state, the state of a state element which corresponds to a part of the update procedure that includes operations for which a reverse operation cannot be generated; and generating a rollback procedure by combining the generated reverse execution procedure and the planned procedure.

(Supplementary note 9) The system update method according to Supplementary note 8, further comprising:

managing a latest state of the system being update during execution of the update procedure; and generating the rollback procedure on the basis of the managed latest state.

(Supplementary note 10) A system update program causing a computer to execute:

a reverse operation generation process for generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

a first procedure generation process for generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

a planning process for planning an operation procedure for transitioning, from an arbitrary state during execution of the update procedure to the current state, the state of a state element which corresponds to a part of the update procedure that includes operations for which a reverse operation cannot be generated; and a second procedure generation process for generating a rollback procedure by combining the generated reverse execution procedure and the planned procedure.

(Supplementary note 11) The system update program according to Supplementary note 10, the program causing the computer to further execute:

a management process for managing a latest state of the system being update during execution of the update procedure, wherein the second procedure generation process includes generating the rollback procedure on the basis of the managed latest state.

(Supplementary note 12) A computer-readable recording medium storing a system update program causing, when executed by a computer, the computer to execute:

generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

planning an operation procedure for transitioning, from an arbitrary state during execution of the update procedure to the current state, the state of a state element which corresponds to a part of the update procedure that includes operations for which a reverse operation cannot be generated; and generating a rollback procedure by combining the generated reverse execution procedure and the planned procedure.

(Supplementary note 13) The recording medium storing the system update program according to Supplementary note 12, the program causing, when executed by the computer, the computer to further execute:

managing a latest state of the system being update during execution of the update procedure; and generating the rollback procedure on the basis of the managed latest state.

INDUSTRIAL APPLICABILITY

The present invention is preferably applicable to the field of automatic generation of exception handling procedures (rollback procedures).

REFERENCE SIGNS LIST

10, 100, 200, 300 System update device
11 Reverse operation generation unit
12 First procedure generation unit
13 Planning unit
14 Second procedure generation unit
101 CPU
102 Main storage unit
103 Communication unit
104 Auxiliary storage unit
105 Input unit
106 Output unit
107 System bus
111 Procedure planning unit
112 Execution order adjustment unit
113 Procedure execution unit 121 Rollback procedure comprehension unit
122 Reverse execution procedure planning unit
123 Partial rollback procedure storage unit
131 Rollback procedure generation unit
132 State management unit
500 System being updated

What is claimed is:

1. A system update device comprising:
   a reverse operation generation unit, implemented by a processor, configured to generate a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;
   a first procedure generation unit, implemented by the processor, configured to generate a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;
   a planning unit, implemented by the processor, configured to plan an operation procedure for transitioning, from an arbitrary state during execution of the update procedure to the current state, the state of a state element which corresponds to a part of the update procedure that includes operations for which a reverse operation cannot be generated; and
   a second procedure generation unit, implemented by the processor, configured to generate a rollback procedure by combining the generated reverse execution procedure and the planned procedure.

2. The system update device according to claim 1, further comprising:
   a management unit, implemented by the processor, configured to manage a latest state of the system being updated during execution of the update procedure, wherein
   the second procedure generation unit is configured to generate the rollback procedure on the basis of the managed latest state.

3. The system update device according to claim 2, further comprising:
   a storage unit, implemented by the processor, configured to store the generated reverse execution procedure, the planned procedure, and the state of the system being updated during execution of the update procedure in association with each other, wherein
   the second procedure generation unit is configured to generate the rollback procedure using the generated reverse execution procedure associated with the managed latest state and the planned procedure associated with the latest state.

4. The system update device according to claim 3, wherein
   the storage unit is configured to store information to be used for combining the generated reverse execution procedure and the planned procedure in association with the generated reverse execution procedure and the planned procedure.

5. The system update device according to claim 1, further comprising:
   an execution unit, implemented by the processor, configured to execute a procedure.

6. The system update device according to claim 1, wherein
   the update procedure is a procedure in which two or more operations are arranged in random order to be executable.

7. The system update device according to claim 1, wherein
   the first procedure generation unit is configured to generate the update procedure on the basis of an initial state of the system being updated and a target state of the system being updated.

8. The system update device according to claim 2, further comprising
   an execution unit, implemented by the processor, configured to execute a procedure.

9. The system update device according to claim 3, further comprising
   an execution unit, implemented by the processor, configured to execute a procedure.

10. The system update device according to claim 4, further comprising
    an execution unit configured to execute a procedure.

11. The system update device according to claim 2, wherein
    the update procedure is a procedure in which two or more operations are arranged in random order to be executable.

12. The system update device according to claim 3, wherein
    the update procedure is a procedure in which two or more operations are arranged in random order to be executable.

13. The system update device according to claim 4, wherein
    the update procedure is a procedure in which two or more operations are arranged in random order to be executable.

14. The system update device according to claim 5, wherein
    the update procedure is a procedure in which two or more operations are arranged in random order to be executable.

15. The system update device according to claim 8, wherein
    the update procedure is a procedure in which two or more operations are arranged in random order to be executable.

16. The system update device according to claim 9, wherein
    the update procedure is a procedure in which two or more operations are arranged in random order to be executable.

17. A system update method comprising:
    generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

planning an operation procedure for transitioning, from an arbitrary state during execution of the update procedure to the current state, the state of a state element which corresponds to a part of the update procedure that includes operations for which a reverse operation cannot be generated; and generating a rollback procedure by combining the generated reverse execution procedure and the planned procedure.

18. The system update method according to claim 17, further comprising:

managing a latest state of the system being updated during execution of the update procedure; and generating the rollback procedure on the basis of the managed latest state.

19. A non-transitory computer-readable recording medium storing a system update program causing, when executed by a computer, the computer to execute:

generating a reverse operation, which is an operation for transitioning the state of a state element to the current state from an arbitrary state during execution of an update procedure on the basis of operations included in the update procedure, wherein the operations are for transitioning, from the current state to a target state, the state of a state element configuring a system being updated, and the update procedure is a procedure including multiple operations arranged in a predetermined order;

generating a reverse execution procedure, which is a procedure including multiple reverse operations generated on the basis of a part of the update procedure that does not include operations for which a reverse operation cannot be generated, wherein said multiple reverse operations are arranged in a reverse order of the predetermined order;

planning an operation procedure for transitioning, from an arbitrary state during execution of the update procedure to the current state, the state of a state element which corresponds to a part of the update procedure that includes operations for which a reverse operation cannot be generated; and generating a rollback procedure by combining the generated reverse execution procedure and the planned procedure.

20. The recording medium storing the system update program according to claim 19, the program causing, when executed by the computer, the computer to further execute:

managing a latest state of the system being updated during execution of the update procedure; and generating the rollback procedure on the basis of the managed latest state.

* * * * *